United States Patent [19]
Fayyad et al.

[11] Patent Number: 6,012,058
[45] Date of Patent: Jan. 4, 2000

[54] SCALABLE SYSTEM FOR K-MEANS CLUSTERING OF LARGE DATABASES

[75] Inventors: Usama Fayyad, Mercer Island, Wash.; Paul S. Bradley, Madison, Wis.; Cory Reina, Kirkland, Wash.

[73] Assignee: Microsoft Corporation, Redmond, Wash.

[21] Appl. No.: 09/042,540

[22] Filed: Mar. 17, 1998

[51] Int. Cl.[7] .................................................. G06F 17/00
[52] U.S. Cl. ..................... 707/6; 707/3; 707/4; 707/5; 707/2
[58] Field of Search ........................................ 707/1–206

[56] References Cited

U.S. PATENT DOCUMENTS

| | | | |
|---|---|---|---|
| 5,819,298 | 10/1998 | Wong et al. | 707/205 |
| 5,832,182 | 11/1998 | Zhang et al. | 707/101 |
| 5,857,179 | 1/1999 | Vaithyanathan et al. | 707/2 |
| 5,890,169 | 3/1999 | Wong et al. | 707/206 |

OTHER PUBLICATIONS

M. R. Anderberg, "Cluster Analysis for Applications" pp. 162–163 Academic Press, New York. 1973.

J. Banfield and A. Raftery, "Model–based Gaussian and Non–Gaussian Clustering", Biometrics, vol. 49: 803–821, pp. 15–34, 1993.

R. Brachman, T. Khabaza, W. Kloesgen, G. Piatetsky–Shapiro, and E. Simoudis, "Mining Business Databases" Communications of ACM 39(11). 1996.

P.S. Bradley, O.L. Managasarian, and W.N. Street. 1997. "Clustering via Concave Minimization", in Advances in Neural Information Processing Systems, 9, M.C. Mozer, M.I. Jordan, and T. Petsche (Eds.) pp. 368–374, MIT Press, 1997.

P. Cheeseman and J. Stutz, "Bayesian Classification (AutoClass): Theory and Results", in Advances in Knowledge Discovery and Data Mining, Fayyad, U.,G. Piatetsky–Shapiro, P. Smyth, and R. Uthurusamy (Eds.) pp. 153–180, MIT Press, 1996.

U. Fayyad, S.G. Djorgovski and N. Weir, "Automating the Analysis and Cataloging of Sky Surveys", Advances in Knowledge Discovery and Data Mining, U. Fayyad, G. Shapiro, P. Smyth and R. Uthurusamy (Eds.), pp. 471–493, Menlo Park, California: AAAI Press/The MIT Press, 1996.

D. fisher, "Knowledge Acquisition via Incremental Conceptual Clustering". Machine Learning, 2:139–172, 1987.

E. Forgy, "Cluster Analysis of Multivariate Data: Efficiency vs. Interpretability of Classifications", biometrics 21:768. 1965.

(List continued on next page.)

*Primary Examiner*—Thomas G. Black
*Assistant Examiner*—David Jung
*Attorney, Agent, or Firm*—Watts, Hoffmann, Fisher & Heinke, Co. L.P.A.

[57] ABSTRACT

In one exemplary embodiment the invention provides a data mining system for use in evaluating data in a database. Before the data evaulation begins a choice is made of a cluster number K for use in categorizing the data in the database into K different clusters and initial guesses at the means, or centroids, of each cluster are provided. Then a portion of the data in the database is read from a storage medium and brought into a rapid access memory. Data contained in the data portion is used to update the original guesses at the centroids of each of the K clusters. Some of the data belonging to a cluster is summarized or compressed and stored as a summarization of the data. More data is accessed from the database and assigned to a cluster. An updated mean for the clusters is determined from the summarized data and the newly acquired data. A stopping criteria is evaluated to determine if further data should be accessed from the database. If further data is needed to characterize the clusters, more data is gathered from the database and used in combination with already compressed data until the stopping criteria has been met.

32 Claims, 11 Drawing Sheets

OTHER PUBLICATIONS

C. Glymour, D. Madigan, D. Pregibon, and P. Smyth. 1997. "Statistical Themes and Lessons for Data Mining", Data Mining and Knowledge Discovery, vol. 1, No. 1.

Jones, "A Note on Sampling From a Tape File", Communications of the ACM, vol.. 5, 1962.

M. Meila and D. Heckerman, 1998. "An Experimental Comparison of Several Clustering Methods", Microsoft Research Technical Report MSR–TR–98–06, Redmond, WA.

R. NG and J. Han, "Efficient and Effective Clustering Methods for Spatial Data Mining", Proc. of VLDB–94, 1994.

D. Pregibon and J. Elder, "A Statistical Perspective on Knowledge Discovery in Databases", in Advances in Knowledge Discovery and Data Mining, U. Fayyad, G. Shapiro, P. Smyth and R. Uthurusamy (Eds.) pp. 83–116. MIT Press, 1996.

S.Z. Selim and M.A. Ismail, "K–Means–Type Algorithms: A Generalized Convergence Theorem and Characterization of Local Optimality." IEEE Trans. On pattern Analysis and Machine Inteligence, vol. PAMI–6 No. 1, 1984.

T. Zhang, R. Ramakrishnan and M. Livny, "Birch: A New Clustering Algorithm and Its Applications." Data Mining and Knowledge Discovery 1(2). 1997.

C. M. Bishop. "Neural Networks for Pattern Recognition".*Bayes Theorem*. Clarendon Press.Oxford pp. 17–23 (1995).

C.M. Bishop. "Neural Networks For Pattern Recognition." *The Normal Distribution*. Clarendon Press.Oxford. pp. 34–38 (1995).

C.M. Bishop. "Neural Networks For Pattern Recognition." *Maximum Likihood*. Clarendon Press. Oxford pp. 39–42 (1995).

C.M. Bishop. "Neural Networks For Pattern Recognition." *Density Estimation in General*. Clarendon Press. Oxford pp. 51–55 (1995).

C. M. Bishop. "Neural Networks for Pattern Recognition." Mixture Models/Maximum Likelihood/EM Algorithm. Clarendon Press.Oxford pp. 59–72 (1995).

R. Duda and P. Hart. "Pattern Classification and Scene Analysis." *Bayes Decision Theory*. John Wiley & Sons pp. 10–13 (1973).

R. Duda and P. Hart. "Pattern Classification and Scene Analysis." *The Normal Density*. John Wiley & Sons. pp. 22–24.

R. Duda and P. Hart. "Pattern Classification and Scene Analysis." *Maximum Likelihood Estimation*: John Wiley & Sons pp. 45–49 (1973).

R. Duda and P. Hart. "Pattern Classification nd Scene Analysis." *Sufficient Statistics and The Exponential Family*. pp. 62–66 John Wiley & Sons (1973).

R. Duda and P. Hart. "Pattern Classification and Scene Analysis." *Density Estimation*. John Wiley & Sons Chap. 4, pp. 85–88 (1973).

R. Duda and P. Hart. "Pattern Classification and Scene Analysis." *Unsupervised Learning and Clustering*. John Wiley & Sons. Chap. 6 pp. 189–200 (1973).

R. Duda and P. Hart. "Pattern Classification and Scene Analysis." *Clustering Criteria (K–Mean)*: John Wiley & Sons Chap. 6 pp. 217–219 (1973).

R. Duda and P. Hart. "Pattern Classificationa nd Scene Analysis," *Iterative Optimization*. (relates to K–Mean/EM) John Wiley & Sons Chap. 6 pp. 225–228 (1973).

K. Fukunaga. "Statistical Pattern Recognition". *Bayes Theorem* Academic Press Chap. 1 pp. 12–13 (1990).

K. Fukanaga. "Statistical Pattern Recognition." *Normal Distributions*. Academic Press. Chap. 2 pp. 16–24 (1990).

K. Fukanaga. "Statistical Pattern Recognition." *Clustering* Academic Press. Chap. 11 pp. 508–512 (1990).

R. Duda and P. Hart. "Pattern Classification and Scene Analysis." *Nearest Mean Reclassification Algorithm (k–Mean)*: Chap.11 pp. 515–523.Academic Press. (1990).

K. Fukanaga. "Statistical Pattern Recognition". *Maximum Likelihood*. Academic Press Chap. 11 pp. 527–532 (1990).

A.P. Dempster, N.M. Laird, and D.B. Rubin, "Maximum Likelihood from Incomplete Data via the EM Algorithm". Journal of the Royal Statistical Society, Series B, 39(1): 1–38, 1977.

M. Ester, H. Kriegel, X. Xu, "A Database Interface for Clustering in Large Spatial Databases", Proc. First International Conference on Knowledge Discovery and Data Mining KDD–95 AAAI Press, 1995.

U. Fayyad, D. Haussler, and P. Stolorz. "Mining Science Data". Communications of the ACM 39(11), 1996.

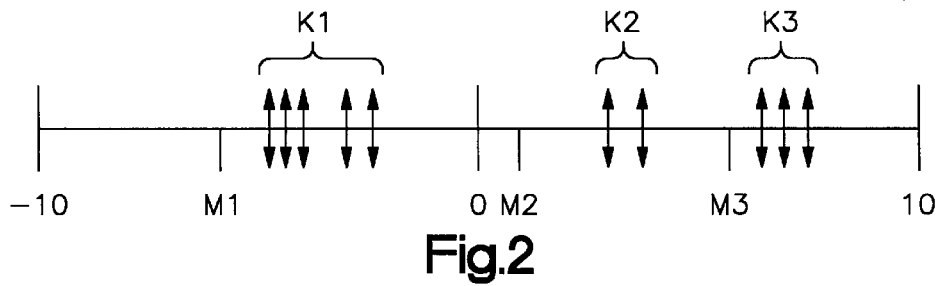
Fig.2
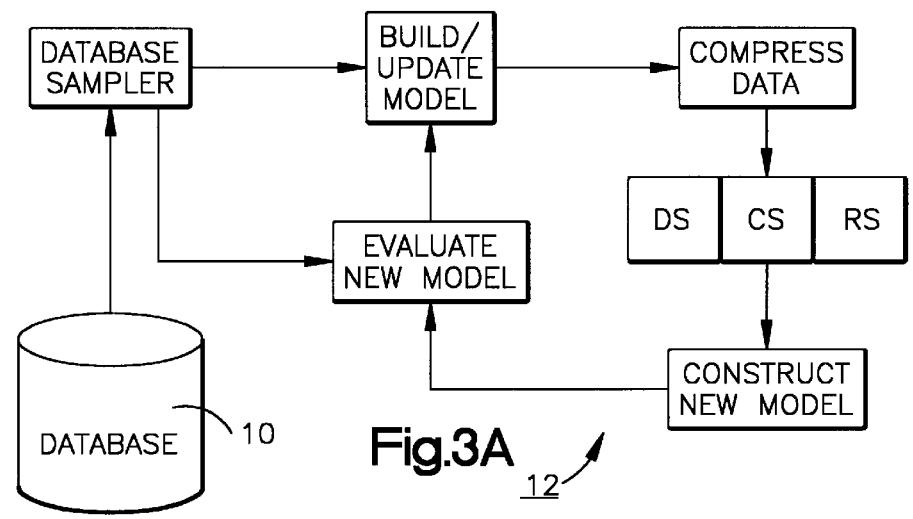
Fig.3A
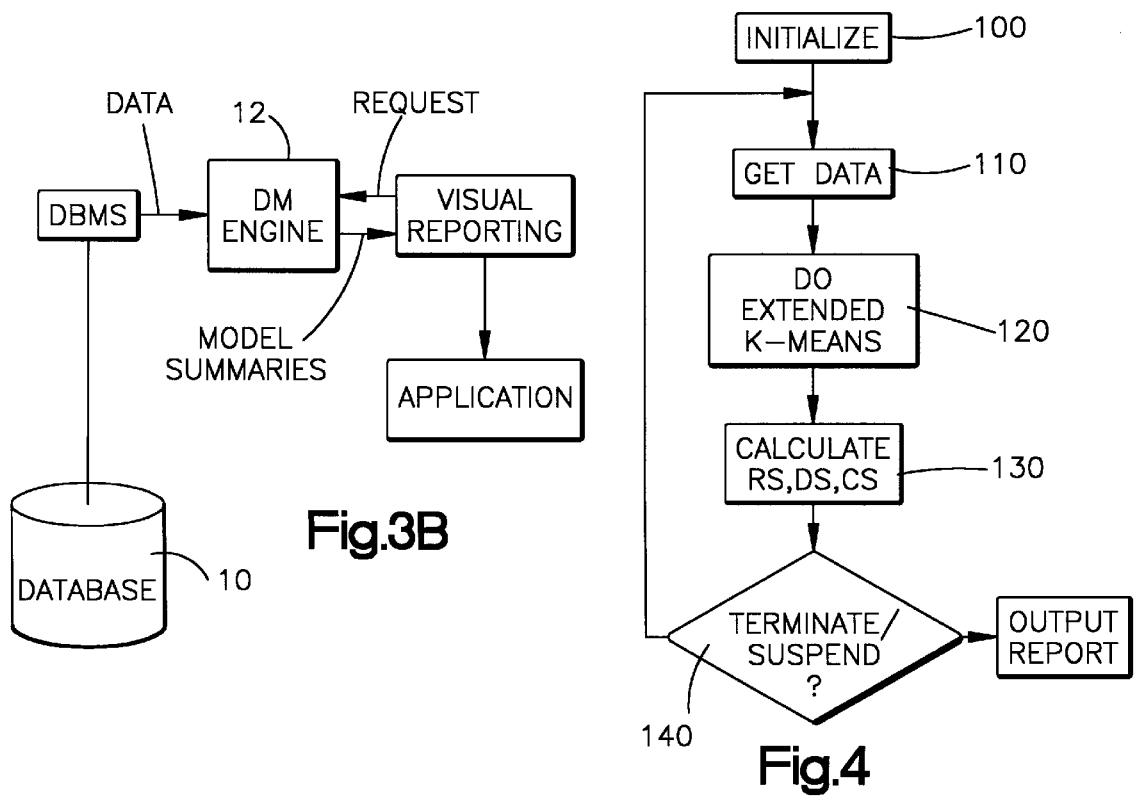
Fig.3B
Fig.4

EXTENDED K-MEANS PROCEDURE

SCALABLE SYSTEM FOR K-MEANS CLUSTERING OF LARGE DATABASES

FIELD OF THE INVENTION

The present invention concerns database analysis and more particularly concerns an apparatus and method for clustering of data into data sets that characterize the data.

BACKGROUND ART

Large data sets are now commonly used in most business organizations. In fact, so much data has been gathered that asking even a simple question about the data has become a challenge. The modern information revolution is creating huge data stores which, instead of offering increased productivity and new opportunities, are threatening to drown the users in a flood of information. Tapping into large databases for even simple browsing can result in an explosion of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Clustering has been studied for decades in statistics, pattern recognition, machine learning, and many other fields of science and engineering. However, implementations and applications have historically been limited to small data sets with a small number of dimensions.

Each cluster includes records that are more similar to members of the same cluster than they are similar to rest of the data. For example, in a marketing application, a company may want to decide who to target for an ad campaign based on historical data about a set of customers and how they responded to previous campaigns. Other examples of such problems include: fraud detection, credit approval, diagnosis of system problems, diagnosis of manufacturing problems, recognition of event signatures, etc. Employing analysts (statisticians) to build cluster models is expensive, and often not effective for large problems (large data sets with large numbers of fields). Even trained scientists can fail in the quest for reliable clusters when the problem is high-dimensional (i.e. the data has many fields, say more than 20).

Automated analysis of large databases can be used to extract useful information such as models or predictors from data stored in the database. One of the primary operations in data mining is clustering (also known as database segmentation). One of the most well-known algorithms for clustering is the K-Means algorithm. Given the desired number of clusters K, this algorithm finds the best centroids in the data to represent the K clusters. These centroids as well as the clusters they describe can be used in data mining to: visualize, summarize, navigate, and predict properties of the data/clusters in a database. Clusters also play an important role in operations such as sampling, indexing, and increasing the efficiency of data access in a database. The invention consists of a new methodology and implementation for scaling the K-means clustering algorithm to work with large databases, including ones that cannot be loaded into the main memory of the computer. Without this method clustering would require significantly more memory, or unacceptably expensive scans of the data in the database.

Clustering is a necessary step in the mining of large databases as it represents a means for finding segments of the data that need to be modeled separately. This is an especially important consideration for large databases where a global model of the entire data typically makes no sense as data represents multiple populations that need to be modeled separately. Random sampling cannot help in deciding what the clusters are. Finally, clustering is an essential step if one needs to perform density estimation over the database (i.e. model the probability distribution governing the data source).

Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

SUMMARY OF THE INVENTION

The invention represents a methodology for scaling clustering algorithms to large databases. The invention enables effective and accurate clustering in one or less scans of a database. Use of the invention results in significantly better performance than prior art schemes that are based on random sampling. These results are achieved with significantly less memory requirement and acceptable accuracy in terms of approaching the true solution than if one had run the clustering algorithm on the entire database.

Known methods can only address small databases (ones that fit in memory) or resort to sampling only a fraction of the data. The disclosed invention is based on the concept of retaining in memory only the data points that need to be present in memory. The majority of the data points are summarized into a condensed representation that represents their sufficient statistics. By analyzing a mixture of sufficient statistics and actual data points, significantly better clustering results than random sampling methods are achieved and with similar lower memory requirements. The invention can typically terminate well before scanning all the data in the database, hence gaining a major advantage over other scalable clustering methods that require at a minimum a full data scan.

The technique embodied in the invention relies on the observation that the K-means process does not need to rescan all the data items as it is originally defined and as implemented in popular literature and statistical libraries and analysis packages. Our method can be viewed as an intelligent sampling scheme that employs some theoretically justified criteria for deciding which data can be summarized and represented by a significantly compressed set of sufficient statistics, and which data items must be carried in computer memory, and hence occupying a valuable resource. On any given iteration of the invention, we partition the existing data samples intro three subsets: A discard set (DS), a compression set (CS), and a retained set (RS). For the first two sets, we discard the data but keep representative sufficient statistics that summarize the subsets. The last, RS, set is kept in memory. The DS is summarized in a single set of sufficient statistics. The compression set CS is summarized by multiple sufficient statistics representing subclusters of the CS data set.

An exemplary embodiment of the invention clusters data that is stored in a database by choosing a cluster number K for use in categorizing the data in the database into K different clusters and accessing data records from a database and bringing a data portion into a rapid access memory. The data from this data portion is assigned to one of the K different clusters and a mean of the data records assigned to a given cluster. Atleast some of the data assigned to the clusters is summarized and the summarization stored. Additional data records from the database are brought into the rapid access memory additional data is assigned to a cluster. An updated mean for the cluster model is determined from the summarized data and the additional portion of data records. As the model is built a criteria is evaluated to determine if further data should be accessed from the database to continue clustering of data from the database.

The exemplary embodiment satisfies certain important issues faced during data mining. A clustering session on a large database can take days or even weeks. It is often desirable to update the clustering models as the data arrives and is stored. It is important in this data mining environment to be able to cluster in one scan (or less) of the database. A single scan is considered costly and clustering termination before one complete scan is highly desirable.

The exemplary embodiment has a clustering solution at any time after a first iteration of data access and clustering. The disclosed embodiment allows the progress of the clustering to be viewed at any time and also gives an estimation of further processing that is needed to complete the clustering. The exemplary embodiment can be stopped, resumed, and saved and then later resumed at the point the process was previously stopped. This allows the data to be incrementally added and used to update a clustering model that has already been started. By means of incrementally accessing and then summarizing at least a portion of the dat from the datbase, the process can be performed in a limited size memory buffer of a computer. In the disclosed embodiment, the buffer size is adjustable by the user. A number of different data access modes are used. Depending on the structure of the database, a sequential scan, index scan or random sampling scan can all be used to access incremental portions of the database.

The process of the invention can be used as a starting model for another clustering process. By was of example, the disclosed K-means clustering process could be performed on a database until a user specified stopping criteria is satisfied. This model defines multiple cluster means and could be used as a more accurate starting point for further clustering using another, perhaps more expensive clustering technique.

An exemplary embodiment of the invention includes a model optimizer. A multiple number of different clustering models are simultaneously generated all in one scan or less of the database. The clustering analysis stops when one of the models reaches a stopping criteria. Alternately, the clustering can continue until all of the multiple models are complete as judged by the stopping criteria.

These and other objects, advantages and features of the invention will be better understood from a detailed description of an exemplary embodiment of the invention which is described in conjunction with the accompanying drawings.

BRIEF DESCRIPTION OF THE DRAWINGS

FIG. 2 is graph of data points on a one dimensional scale as those data points might appear if plotted from a random sampling of a database;

FIG. 3A and 3B are schematic depictions showing software components of the invention;

FIG. 4 is a flow diagram of an exemplary embodiment of the invention;

DETAILED DESCRIPTION OF EXEMPLARY EMBODIMENT OF THE INVENTION

A large database 10 for which the present invention has particular utility contains many records stored on multiple, possibly distributed storage devices. Each record has many attributes or fields which for a representative database might include age, income, number of children, number of cars owned etc. A goal of the invention is to characterize clusters of data in the database 10. This task is straightforward for small databases (all data fits in the memory of a computer for example) having records that have a small number of fields or attributes. The task becomes very difficult, however, for large databases having huge numbers of records with a high dimension of attributes.

Overview of Scalable Clustering

FIG. 4 is a flow chart of the process steps performed during a scalable clustering analysis of data in accordance with the present invention. An initialization step 100 includes a step of initialiing a number of data structures shown in FIG. 6A–6D and choosing a cluster number K for characterizing the data.

Figure 1:
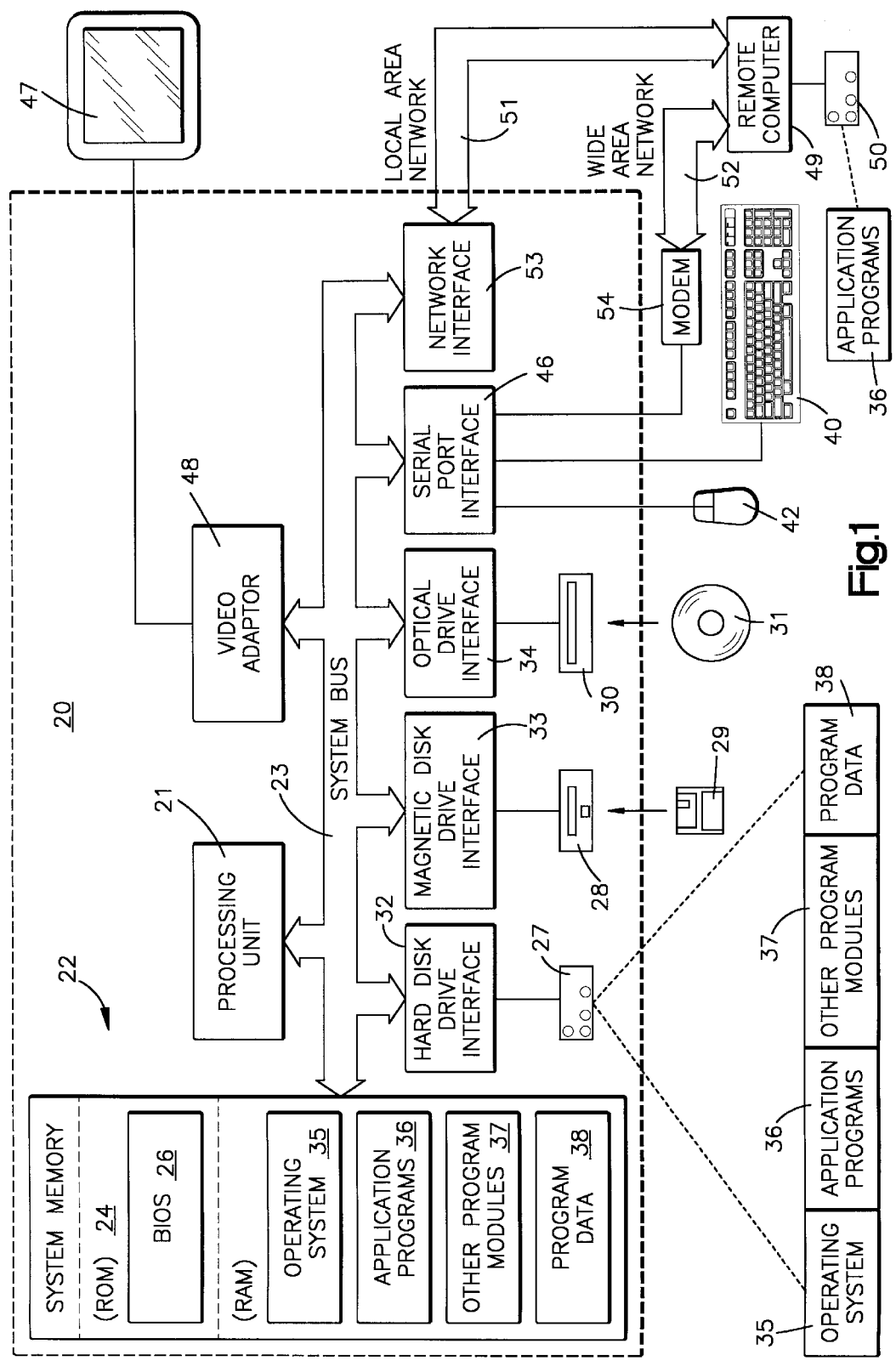
FIG. 1 is a schematic illustration of a computer system for use in practicing the present invention.

A next step 110 is to sample a portion of the data in the database 10 from a storage medium to bring that portion of data within a random access memory (into RAM for example, although other forms of random access memory are contemplated) of the computer 20 shown in FIG. 1. In general, the data has a large number of fields so that instead of a single dimension analysis, the invention characterizes a large number of vectors where the dimension of the vector is the number of attributes of the data records in the database. The data structure 180 for this data is shown in FIG. 6C to include a number r of records having a potentially large number of attributes.

The gathering of data can be performed in either a sequential scan that uses only a forward pointer to sequentially traverse the data or an indexed scan that provides a random sampling of data from the database. When using the index scan it is a requirement that data not be accessed multiple times. This can be accomplished by marking data tuples to avoid duplicates, or a random index generator that does not repeat. In particular, it is most preferable that the first iteration of sampling data be done randomly. If it is known the data is random within the database then sequential scanning is acceptable. If it is not known that the data is randomly distributed, then random sampling is needed to avoid an inaccurate representative of the database.

Returning to FIG. 4, a processor unit 21 of the computer 20 next executes 120 a clustering procedure using the data brought into memory in the step 110 as well as compressed data in the CS and DS data structures. In accordance with an exemplary clustering process described in greater detail below, the processor 21 assigns data contained within the portion of data brought into memory to a cluster and determines a mean for each attribute of the data assigned to a given cluster. A data structure for the results or output model of the analysis is a model of the clustering of data and is depicted in FIG. 6D. This model includes K records, one for each cluster. In an exemplary embodiment which assumes that the attributes of the database are independent of each other, each record has three required components: 1) a vector 'Sum' representing the sum for each of the attributes or dimensions of the vector data records in a given cluster, 2) a vector 'Sums' representing the sum of the attributes squared and 3) an integer 'M' counting the number of data records contained in or belonging to the corresponding cluster. These are sufficient to compute the mean (center) and covariance (spread) of the data in a cluster.

A next step 130 in the FIG. 4 flowchart summarizes at least some of the data used in the present iteration to characterize the K clusters. This summarization is contained in the data structures DS, CS of FIGS. 6A and 6B. The summarization takes up significantly less storage in a computer memory 25 than the vector data structure (FIG. 6D) needed to store individual records. Storing a summarization of the data in the data structures of FIGS. 6A and 6B frees up more memory allowing additional data to be sampled from the database 10.

Before looping back to get more data the processor 21 determines 140 whether a stopping criteria has been reached. One stopping criteria that is used is whether the analysis has produced a good enough model (FIG. 6D) by a standard that is described below. A second stopping criteria has been reached if all the data in the database 10 has been used in the analysis.

One important aspect of the invention is the fact that instead of stopping the analysis, the analysis can be suspended. Data in the data structures of FIG. 6A–6D can be saved (either in memory or to disk) and the scalable clustering analysis can then be resumed later. This allows the database to be updated and the analysis resumed to update the clustering statistics without starting from the beginning. It also allows another process to take control of the processor 21 without losing the state of the clustering analysis. The suspension could also be initiated in response to a user request that the analysis be suspended by means of a user actuated control on an interface presented to the user on a monitor 47 while the K-means analysis is being performed.

FIGS. 3A and 3B depict an operating environment of the invention. Data in the database 10 is accessed through a database management system that sends data to a data mining engine 12. The data mining engine 12 processes requests from an application 14 and responds by sending back model summaries to the application. The software components of the data mining engine 12 are depicted in more detail in FIG. 3A.

Figure 9:
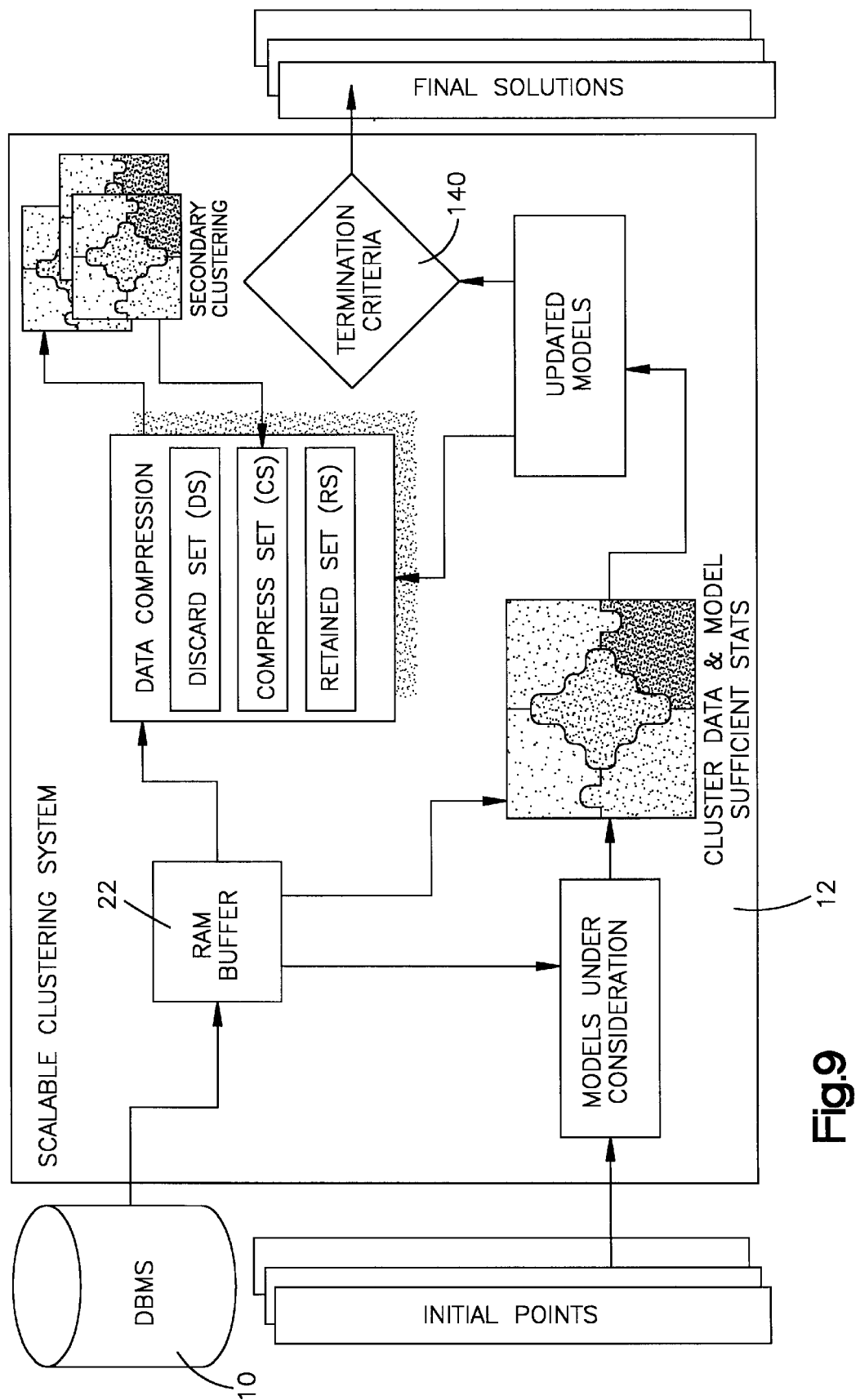
FIG. 9 is a schematic depiction of a scalable clustering system for generating multiple clustering models from one or less scans of a database.
Figure 10:
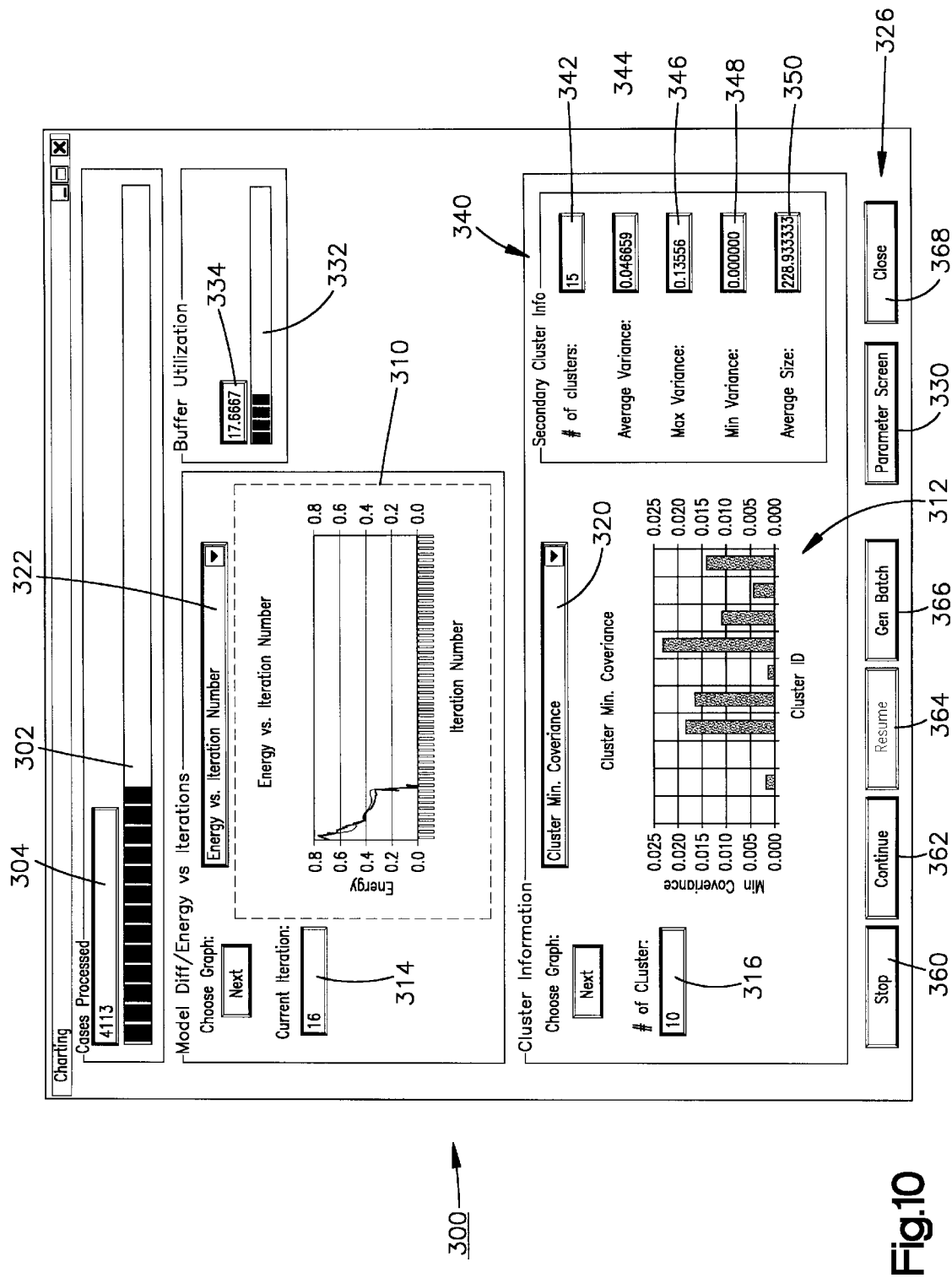
FIGS. 10–14 are user interface screens indicating various aspects of the clustering process.
Figure 11:
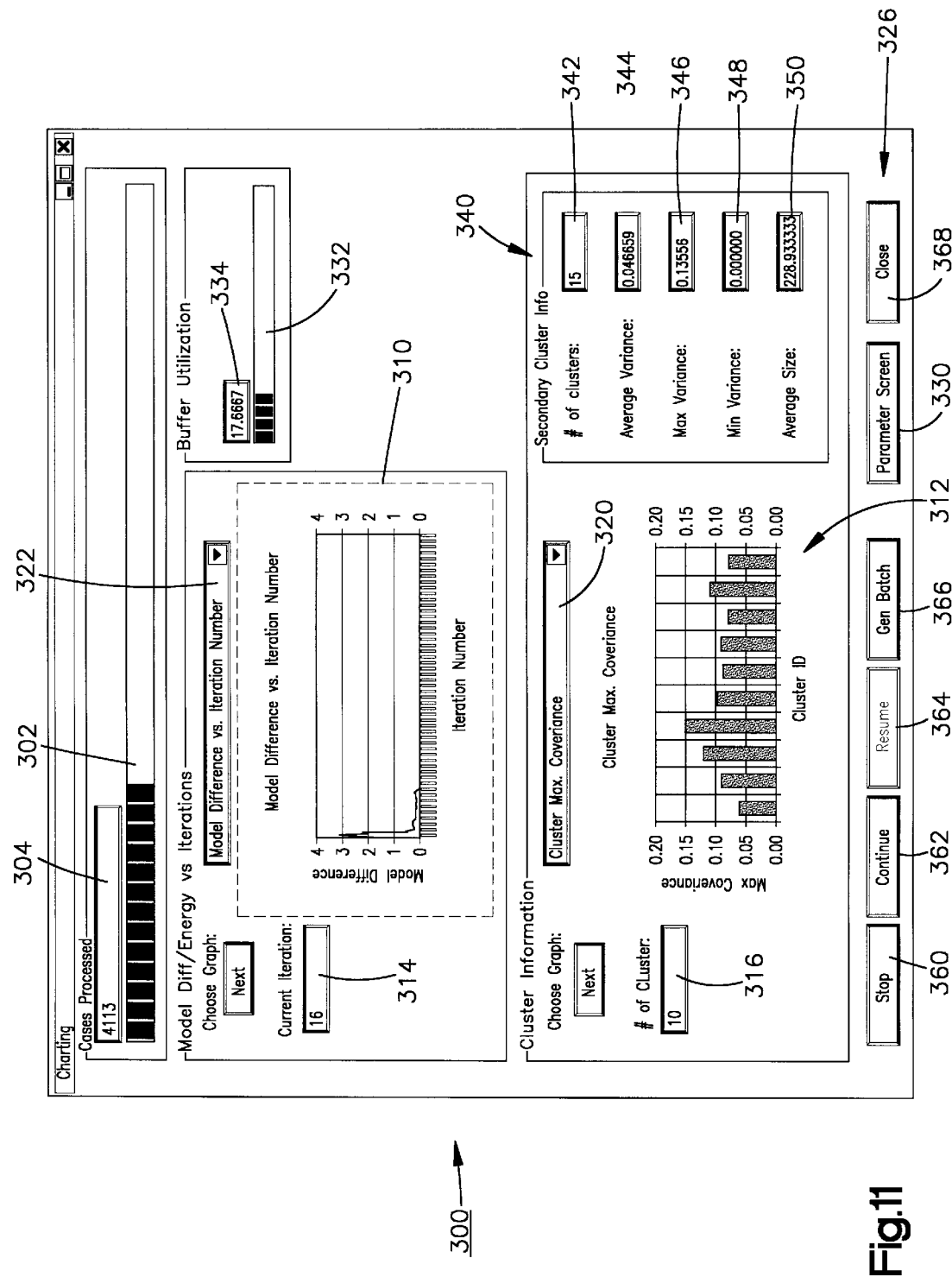
Figure 12:
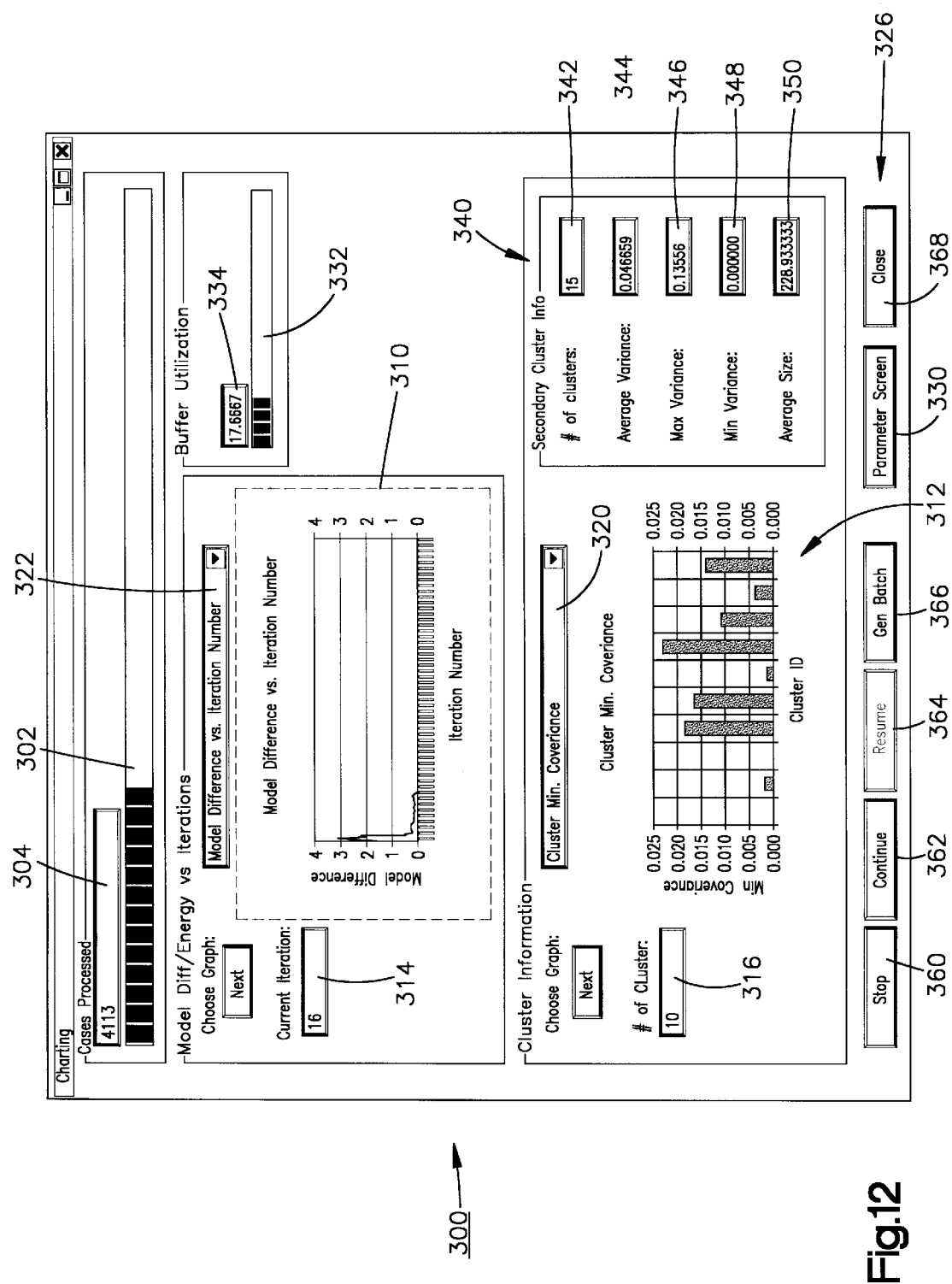
Figure 13:
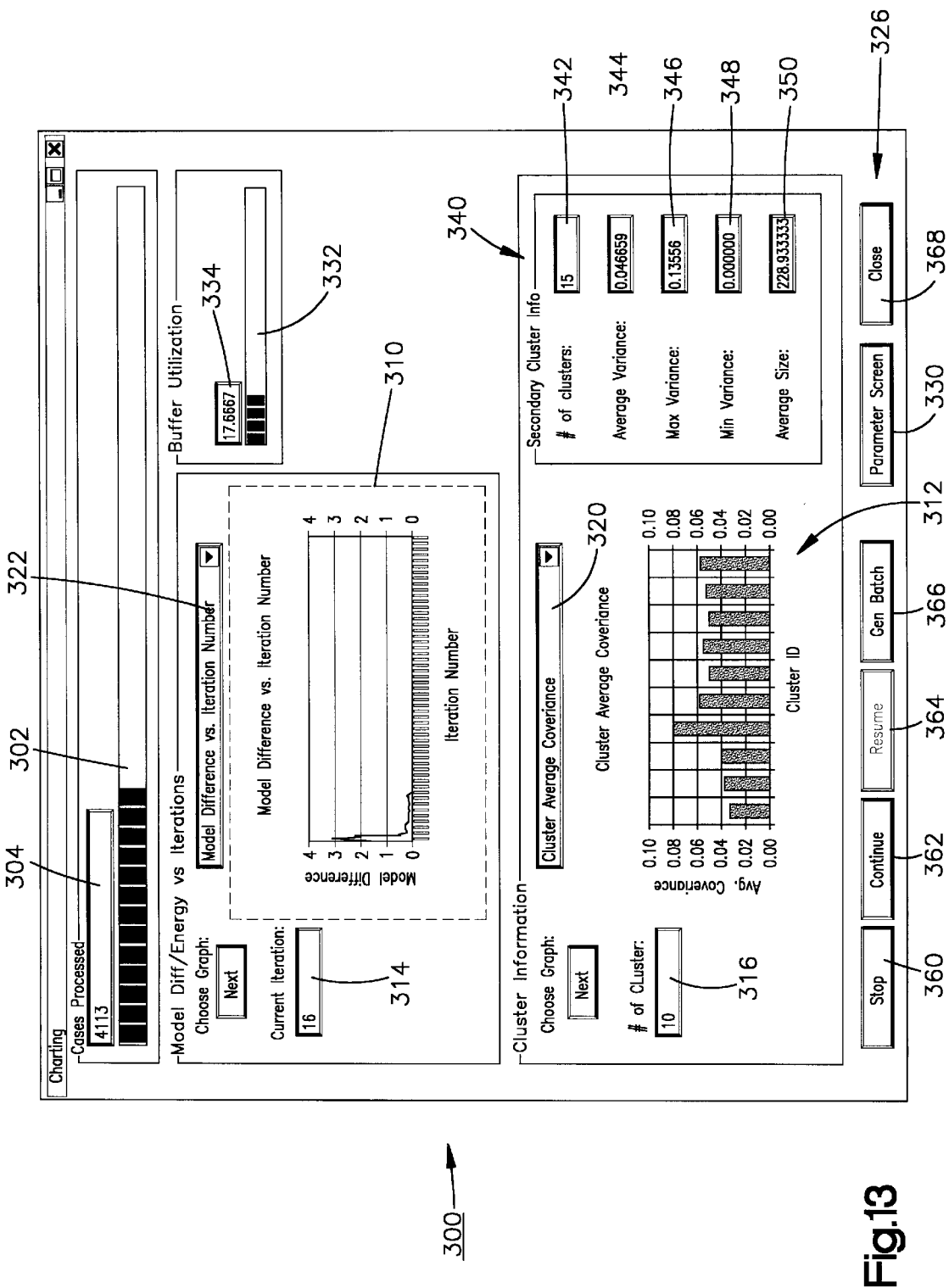
Figure 14:
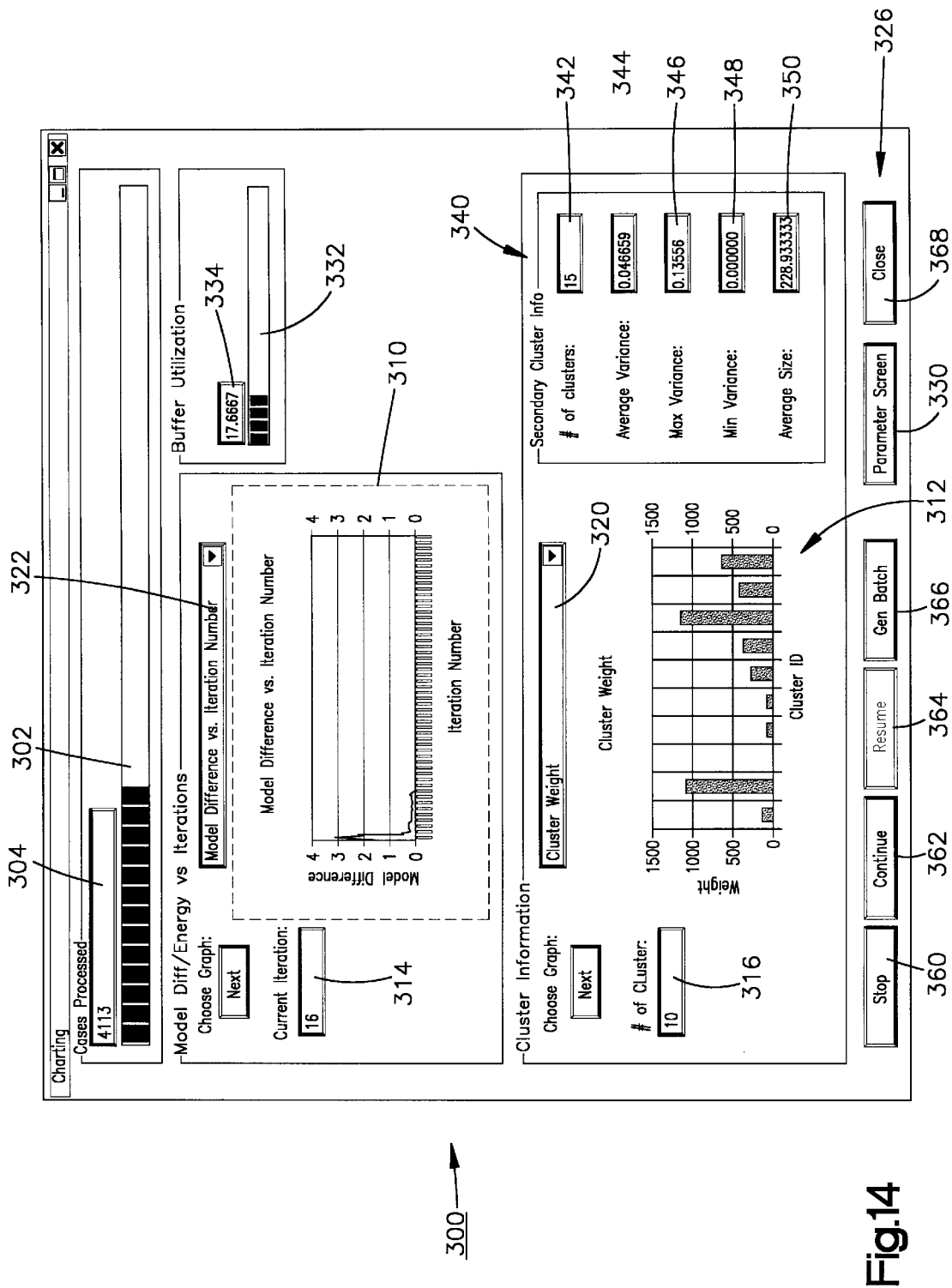

FIG. 9 is an overview schematic of a scalable clustering system showing a scalable clustering system for producing multiple clustering models. An output from such a system produces multiple solutions or models from data stored on the database 10.

K-Means Clustering

There is a large literature of known data clustering techniques. One known technique is the so called K-means clustering process which is summarized in Duda-Hart (Pattern Classification and Scene Analysis) 1973 John Wiley & Sons, Inc., New York. An exemplary embodiment of the present scalable clustering analysis is described by reference to the K-Means Clustering process.

Consider a one dimensional depiction of data from a database illustrated in FIG. 2. Spaced along a horizontal axis that extends from a min value of −10 to a max of 10 are multiple data points. In a typical database this would be one attribute of a multi-attribute record. As an example, the FIG. 2 attribute might constitute net worth in hundreds of thousands wherein an excess of debt to equity would result in a negative number. FIG. 2 illustrates a small part of the data obtained from the database 10 after a first sampling of data.

One can visually determine that the data in FIG. 2 is lumped or clustered together. Classifying the data into clusters is dependent on a staring cluster number. If one chooses three clusters for the data of FIG. 2 the data would generally fall into the clusters K1, K2, K3 of the figure.

The K-Means algorithm takes as input: the number of clusters K, a set of K initial estimates of the cluster means, and the data set to be clustered. The means (centroids) define the parameters of the model. One traditional K-means evaluation starts with a random choice of cluster centroids or means that are randomly placed within the extent of the data on the x axis. Call these M1, M2, and M3 in FIG. 2.

Each cluster is represented by its mean and each data item is assigned membership in the cluster having the nearest mean. Distance is the Euclidean distance (or L2 norm): for a data point (d-dimensional vector) x and mean $\mu$, is given by:

$$\text{Dist}(x, \mu) = \sqrt{\sum_{i=1}^{d} (x_i - \mu_i)^2}.$$

The cluster model is updated by computing the mean over the data items assigned to it. The model assumptions relating to the classic K-Means algorithm are: 1) each cluster can be effectively modeled by a Gaussian distribution with diagonal covariance matrix having equal diagonal elements (over all clusters), 2) the mixture weights ($W_i$) are also assumed equal. Note that K-Means is only defined over numeric (continuous-valued) data since the ability to compute the mean is a requirement. A discrete version of K-Means exists and is sometimes referred to as harsh EM. The K-Means algorithm finds a locally optimal solution to the problem of minimizing the sum of the L2 distance between each data point and its nearest cluster center (usually termed "distortion").

For a database that fits in memory all data within the database can be used to calculate the K-means clustering centroids. The output from such a prior art process will be the K centroids and the number of data points that fall within each of the K clusters.

Data Structures

FIGS. 6A–6D summarize the data structures used to perform the scalable K-means analysis. The output from the analysis is stored in a data structure designated MODEL (FIG. 6D) which includes an array 152 of pointers, each pointer points to a first vector 154 of n elements (floats) 'Sum', a second vector 156 of n elements (floats) 'SumSq', and a scalar 158 designated M. The number n corresponds to the number of attributes of the database records that are being clustered.

Figure 6A:
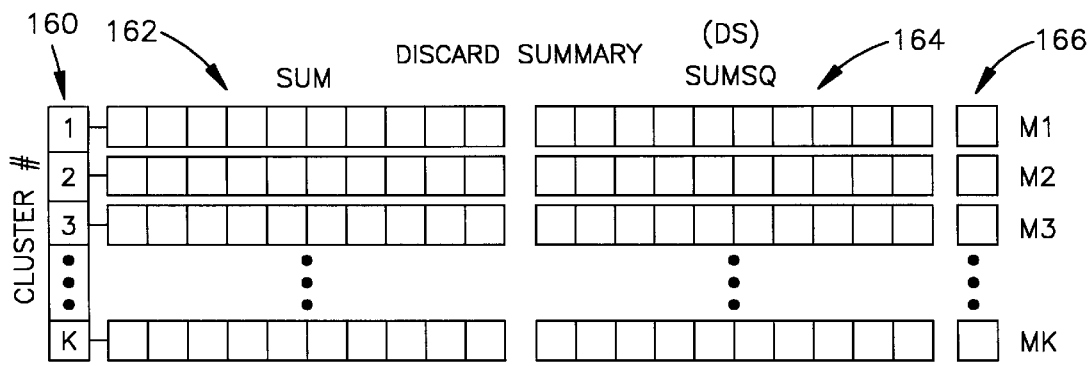
FIG. 6A–6D are illustrations of data structures utilized for storing data in accordance with the exemplary embodiment of the invention.
Figure 6B:
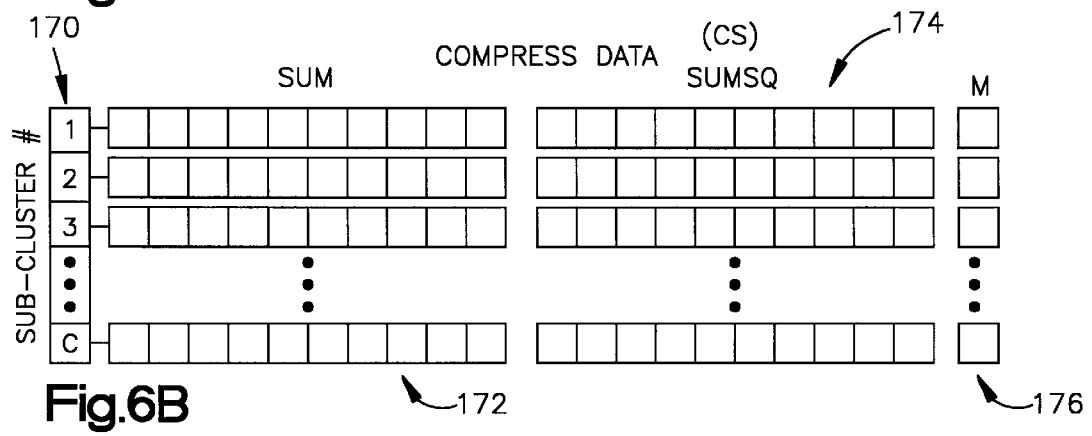
Figure 6C:
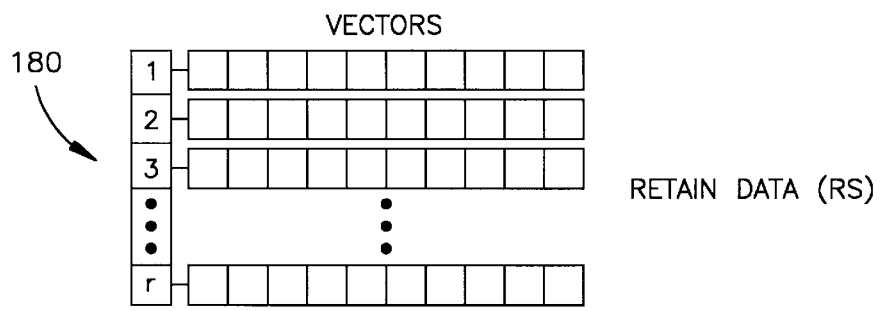
Figure 6D:
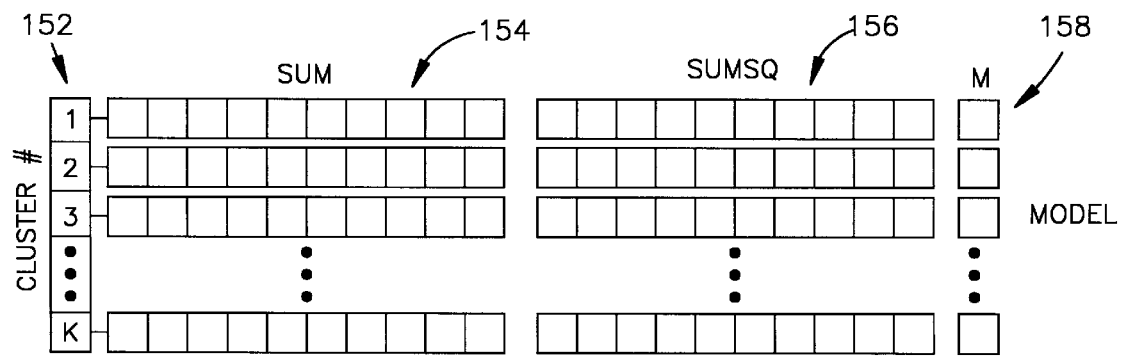

FIG. 6A depicts a data structure designated DS including an array 160 of pointers, each of which identifies a vector 162 of n elements (floats) 'Sum', a vector 164 of n elements (floats) 'SumSq', and a scalar 166 designated 'M'.

A further data structure designated CS is an array of c pointers 170, where each pointer points to a vector 172 of n elements (floats) 'Sum', a vector 174 of n elements (floats) 'SumSq', and a scalar 176 designated as M.

An additional data structure designated RS (FIG. 6C) is an array 180 of r elements where each element points a vector of n elements (floats) representing a singleton data point of a type designated SDATA. As data is read in from the database it is stored in the set RS and this data is not associated with any of the K clusters. An exemplary implementation of the scalable K-means analysis has RS being an array of pointers to elements of type SDATA, and an associated SumSq vector is null and the scalare M=1.

Table 1 below is a list of ten SDATA vectors which constitute sample data from a database 10 and are stored as individual vectors in the data structure RS.

TABLE 1

| CaseID | AGE | INCOME | CHILDREN | CARS |
|---|---|---|---|---|
| 1 | 30 | 40 | 2 | 2 |
| 2 | 26 | 21 | 0 | 1 |
| 3 | 18 | 16 | 0 | 1 |
| 4 | 45 | 71 | 3 | 2 |
| 5 | 41 | 73 | 2 | 3 |
| 6 | 67 | 82 | 6 | 3 |
| 7 | 75 | 62 | 4 | 1 |
| 8 | 21 | 23 | 1 | 1 |
| 9 | 45 | 51 | 3 | 2 |
| 10 | 28 | 19 | 0 | 0 |

Table 2 below tabulates mean values chosen for a starting point assuming K=3 for performing the scalable K-means clustering analysis on the data of table 1.

TABLE 2

| Cluster # | AGE | INCOME | CHILDREN | CARS |
|---|---|---|---|---|
| 1 | 55 | 50 | 2.5 | 2 |
| 2 | 30 | 38 | 1.5 | 2 |
| 3 | 20 | 24 | 1 | 1 |

An important concept of the present invention is the summarization or compression of data points of type SDATA contained in the dataset RS (TABLE 1) sampled from the database into the two data structures DS, CS to allow more sampling of data from the database. During each processing iteration of the FIG. 4 flowchart the scalable K-means analysis calls an 'extended K-means' procedure 120 that utilizes the compressed data as well as the remaining data samples contained in the dataset RS.

On a first iteration through the FIG. 4 process the set DS (FIG. 6A) is empty. Updates to the set DS are performed at the step 130 for each cluster of the range, i=1, . . . K. For each cluster i the processor determines which singleton data elements (elements of the set RS of type SDATA), assigned to cluster i will nor change cluster membership over future data samples. These points will be used to augment the i-th element of the set DS which contains the sufficient statistics summarizing these singleton points. These points are removed from the set RS and used to update the sufficient statistics for the i-th cluster of the set DS.

Two conceptual data structures help explain a first embodiment of the method of updating the set DS. This first embodiment is referred to as the Worst Case Analysis method. These conceptual data structures hold the upper and lower bounds defining an n-dimensional (n=# attributes) confidence interval (CI) on the means or centroids of the K clusters computed so far. A list structure designated LOWER is a vector of k elements (one for each cluster) where each element points to a vector of n elements (floats) holding the lower bounds for each attribute of the CI on the mean of the corresponding cluster. For example LOWER(3). LowVec(2) is the value of the lower bound on the CI for the third cluster along dimension 2. A second structure designated UPPER is a vector of k elements (one for each cluster) where each element points to a vector of n elements (floats) holding the upper bounds for the CI on the mean or centroid of the corresponding cluster. Singleton Points (Elements of RS) not changing cluster assignment when the K cluster centers are perturbed, within their respective confidence intervals in a worst-case fashion, can be summarized by adding them to the set DS and removing them from RS. Appendix A is a summarization of the Worst Case Analysis that defines LOWER and UPPER as well as the process of updating of the set DS using the Worst Case Analysis.

A second embodiment of the process of updating the dataset DS is referred to as the Threshold Analysis. For this second embodiment a data structure is used that helps sort the singleton elements of RS (of type SDATA) by their Mahalanobis distance (See Duda and Hart, Pattern Classification and Scene Analysis referenced above) to a given cluster center. A structure RSDist is a list of r elements (r is the number of singleton data elements in the set RS) where each element in RSDist points to 2 objects: 1) float called "MahalDist" which holds the Mahalanobis distance of the corresponding element in RS to the nearest cluster center and 2) an integer indicating the cluster whose center is nearest to the given point in RS, called "ClustAssign". Appendix C summarizes the calculation of the Mahalanobis distances.

A third embodiment for updating the dataset DS is based upon the distance of a data point from the then current mean. If this distance for a point rs contained in RS is less than a specified distance, then the point is removed from RS and added to DS by updating the sufficient statistics of DS to include the rs point.

Figure 5:
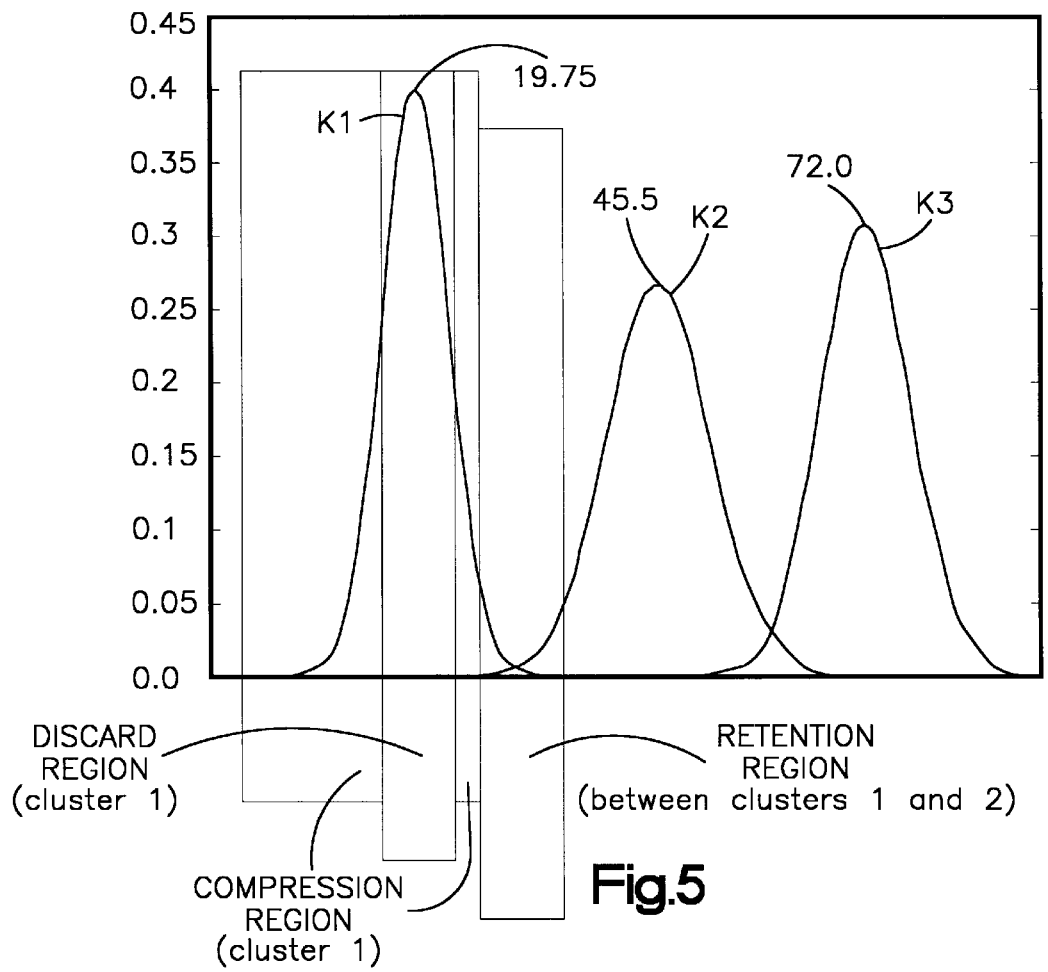
FIG. 5 is a one-dimensional plot of data distribution of three clusters of data.

FIG. 5 depicts a clustering in one dimensional, for example, income data from the table 1 list of data. Three clusters K1, K2, K3 are made up of much larger numbers of data vectors SDATA. The data structure DS that summarizes data for the cluster designated K1 is centered within the generally gaussian shaped curve depicting that cluster. Regardless of the technique used, certain data safely 'belongs' to the cluster K1 so it is safe to compress or summarize the data in this range in the form of the sufficient statistics contained in the DS (discard region) data structure.

Subclusters in dataset CS

After the compression of data into the DS data structure, there is still a fairly large amount of data (SDATA) contained to the left and the right of the centroid of K1 in FIG. 5 that neither the worst case analysis (Appendix A) nor the threshold analysis (Appendix B) identifies for compression into the set DS. These point fall within the 'compression region' for cluster 1. The present invention also summarizes at least some of this data in the form of a dataset designated CS. An exemplary process for determining the CS dataset is summarized in the psuedocode of Appendix C. Briefly, a dataset RSNew is made up of the dataset RS after removing the set DS from the original set RS.

The process of determining the new CS data set begins by merging and removing any singleton points from RSNew into CS which can safely be merged without violating a specified "density" criteria. For each data point in RSNew, the appendix C procedure finds the CS subcluster which is closest to it. If the data point can be merged into CS without violating the specified "density criteria" of the CS subcluster, then the data point is merged into that particular CS subcluster and removed from RSNew. If it doesn't satisfy the criteria, then the data point is left in RSNew.

The process of determining the data set CS then continues by finding a set of "dense" subclusters within the set RSNew. This is done by performing a traditional K-means analysis on the data in the set RSNew using a cluster number K' (Kprime) greater than K, the number of clusters used in performing the scalable K-means analysis. The set of sufficient statistics (Sum, Sumsq, and M) for the K' subclusters found by this procedure are appended to the current set of sufficient statistics in the dataset CS. Hence CS is augmented by K' elements to produce a number c of subclusters. This augmented list is then filtered and elements are merged (if possible), reducing the size of the list.

If the number of data points (M in the data structure CS) is less than a threshold value, (MinPoints in Appendix C) the data from this analysis is not clustered and the data is instead kept in the set RSNew. Furthermore only dense clusters are kept in CS. For each subcluster remaining after the threshold value of points criteria has been checked, if the maxiumum measure of spread computed from (SUMSQ) along any of the n dimensions (attributes) of the candidate subcluster is less than a threshold (StdTol in appendix C) the data from that subcluster is also left in RSNew and not summarized in CS. These two criteria remove the elements of CS corresponding to subclusters which are either too small (in terms of number of points) or too 'spread out'.

A final step is the combining of subclusters using hierarchical agglomerative clustering. An attempt is made to merge two elements of the dataset CS. If the larger, merged subcluster still satisfies the 'spread' criteria discussed above, these two subclusters are removed from the set CS, and the larger subcluster representing these two smaller subclusters is added to the dataset CS. This process continues until the merging process produces no larger subclusters that still satisfy the "dense" criteria. The data structure CS contains c elements that are then used in the K-means analysis.

Extended K-means Procedure

Figure 7:
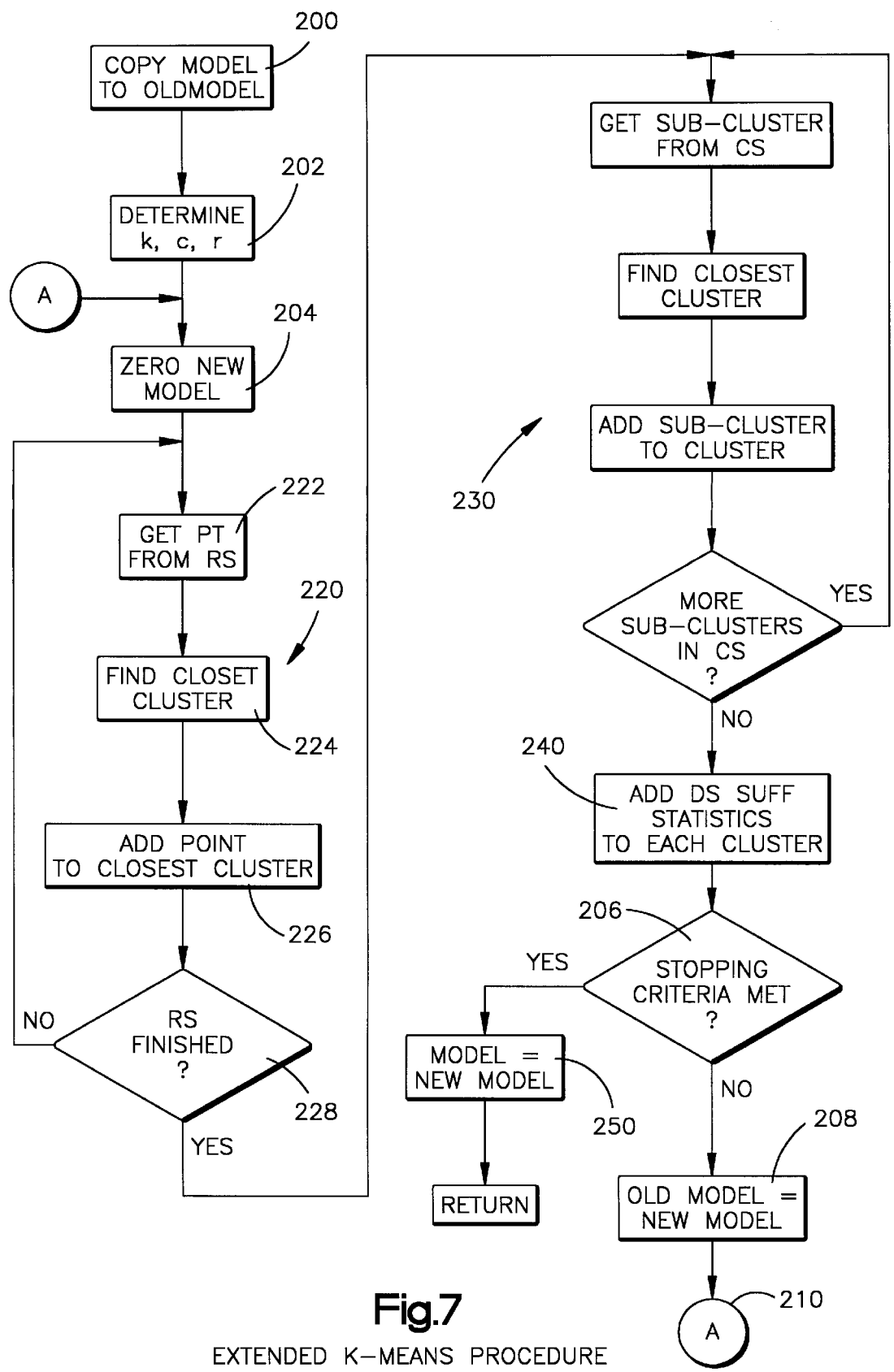
FIG. 7 is a flow diagram of an exemplary embodiment of an extended K-means analysis of data.

An extended K-means procedure 120 includes looping constructs for updating the current model that are summarized in the flow chart of FIG. 7. Certain utility functions are needed to perform this extended K-means procedure. A function ModelCopy(ModelNew, ModelOrig ) copies the model ModelOrig into ModelNew. A function Length (DataStructure) returns the length of the pointer array for the data structures of FIG. 6 so that for example, Length(CS)=c and Length(RS)=r. Zero( Model ) takes the data structure for the model in FIG. 6D and sets all elements to 0.0. A function Distance2Norm(point1, point2) measures the distance between two vectors point1 and point2.

The extended K-means procedure of FIG. 7 begins with a step 200 of copying the existing model into an old model data structure. The process next determines 202 the length of the RS, DS, and CS data structures of FIGS. 6A–6C and returns the values k, c, and r. The data structure NewModel is then zeroed or initialized 204. The process updates the NewModel until a test 206 indicates a stopping criteria has been met. If the stopping criteria has not been met, the process saves 208 the new model in the old model data structure and branches 210 to zero a next subsequent new model. The test 206 is similar to the test 140 described in conjunction with the scalable K-means process overview.

After initialization of a new model, that model is updated in a loop 220 that updates the model for each of the r vectors in the dataset RS. The loop gathers data 222 a point at a time from the set RS and determines 224 what cluster to assign that data point to. This is done by finding the distance from the data point to the mean of each of the then existing means of the old model. By reference to FIG. 6D it is seen that the model includes the Sum for a given cluster K and therfore the mean or centroid of each dimension is given by this value divided by the scalar M for the cluster. Once the closest cluster is found, the New model Sum and SumSq component for that closest cluster is updated by adding the data point to the vector Cluster(closest).sum and then squaring the components and adding them to the Cluster(closest) .SumSq vector. The scalar M for a cluster is incremented by one for each point added to that cluster. Once the loop over the r vectors is completed, the procedure updates the model based on the compressed statistics stored in the c subclusters found in the data structure CS. On an initial loop through the FIG. 4 scalable K-means process there are no CS or DS structures. Table 3 below indicates the contents of the model (FIG. 6D) after the RS portion of the extended K-means process on data points of Table 1.

TABLE 3

| SUM Cluster # | AGE | INCOME | CHILDREN | CARS | M |
|---|---|---|---|---|---|
| 1 | 228 | 288 | 15 | 9 | 4 |
| 2 | 75 | 91 | 5 | 4 | 2 |
| 3 | 93 | 79 | 1 | 3 | 4 |

| SUMSQ Cluster # | AGE | INCOME | CHILDREN | CARS |
|---|---|---|---|---|
| 1 | 51984 | 8244 | 225 | 81 |
| 2 | 5625 | 8281 | 25 | 16 |
| 3 | 8649 | 6241 | 1 | 9 |

The ten records of TABLE 1 will fit in memory, and a conventional K-means analysis is possible. For a large data base containing millions of records, the ten records constitute only a part of one data gathering step. Table 4 below lists a K-means clustering of data performed on the ten records with K=3.

TABLE 4

| Cluster # | AGE | INCOME | CHILDREN | CARS |
|---|---|---|---|---|
| 1 | 57 | 72 | 3.75 | 2.25 |
| 2 | 37.5 | 45.5 | 2.5 | 2 |
| 3 | 23.25 | 19.75 | 0.25 | 0.75 |

To free up computer memory for gathering more of the millions of records some of the ten records shown in Table 1 are candidates to be compressed into the data structures CS, DS. The cluster averages for the income attribute of the ten records are labeled in the FIG. 5 depiction. Record number 10 has an income of '19' and for this one dimension falls safely within the DS (discard region) centered around the cluster K1 in FIG. 5. Visualizing the situation over many attributes becomes more difficult but the techniques summarized in the appendices deal with vectors and identify records within RS for compression. Record number 8 in Table 1 has an income of '23'. Assume this record does not fall within the DS region and therefore becomes a candidate for inclusion in the CS (compress) dataset. Note, the cluster mean for the second cluster K2 is at an income of 45.5 k dollars. Data falling between the two means of 19.75 and 45.5 typically will not be classed in either the DS or the CS dataset. It is retained in RS and used on the next iteration to perform the clustering.

After the initial iteration of the FIG. 4 process, the CS and DS structures contain sufficient statistics, and the extended K-means procedure of FIG. 7 must take into account this data in determining the new model when the procedure is again called at the step 120 of the scalable K-means analysis. To update the model based on the sufficient statistics contained in the dataset CS the FIG. 7 procedure executes a loop 230 over each of the subclusters c in CS and determines which of the K clusters in the Model (FIG. 6D) that subcluster is closest to. Assume subcluster p is closest to cluster q. When this fact is discovered the sufficient statistics of cluster q are updated by adding the contents subcluster (p).sum to cluster(q).sum and the statistics subcluster(p).sumsq to cluster(q).sumsq. Additionally, the value of subcluster(p).M for the subcluster is added to the to the value cluster(q).M.

At a step 240 the extended K-means procedure updates the NewModel for the clusters summarized in DS. There is no need to search for the cluster nearest the clusters in DS since the elements of DS will always (or are assumed to be always) assigned to the same cluster. The step 240 merely loops over the clusters in DS and adds their sufficient statistics to the new model of FIG. 6D. (NewModel(l).Sum+=DS(l). Sum, NewModel(l).SumSq+=DS(l).SumSq and NewModel(l).M+=DS(l).M) Once the contributions of CS and DS are added the stopped criteria is checked 206 to see if the procedure has converged to a solution. In one exemplary embodiment a variable CenterDist is set to zero and for each of the clusters K, a distance between the centroid of the old model and the centroid of the new model is determined and added to the CenterDist variable. Once all K distances have been calculated, and added together the CenterDist value is divided by the number of clusters K and compared to a value 'StopTol' which is used as a measure of how stable the model has become. If the value of CenterDist is smaller than the value 'StopTol' then the procedure returns, otherwise the procedure branches back to recalculate the model using the same data in RS, CS, and DS but with a different "old model".

Stopping Criteria at the Step 140

Each time the procedure 120 returns, the RS, DS and CS data struacutres are updated and the test of the stopping criteria 140 is performed Three alternative stopping criteria are proposed for use in the scalable K-mean procedure. (methods 1 and 2 of the Appendix D pseudocode summarize two of these criteria) A first method terminates the analysis if the difference between the K-means, measured in some norm, over a given number of data samples is below a given tolerance. A second method terminates if the difference in an "energy" function (measure of distortion) minimized by the k-mean analysis falls below a given tolerance over a fixed number of data samples. A third terminates if the number of data samples from the database is exhausted. A fourth stopping criteria is actually a suspension of the scalable K-means analysis rather than stopping.

Note that if storage permits, the most general storage scheme would keep in main memory the last z models, hence easily allowing the plug-in of either stopping criteria 1 or 2 by easily computing either PrevModelDiff (in the case that the first stopping criteria is chosen, (see appendix D) from these z models or by computing PrevEnergyDiff (in the case that the second stopping criteria is chosen, see appendix D).

As seen in FIG. 1 the computer 20 includes a monitor 47 for displaying a user interface. A suitable interface for monitoring the clustering analysis of FIG. 4 includes a reference to the amount of data as a percentage of the entire database 10 that has been used in defining the model shown in FIG. 6D. This interface allows the user to activate a button to suspend the operation of updating the model as well as adjusting the stopping criteria (Appendix D). The ability to suspend allows the database to be updated and then clustering can be resumed without resorting to a completely new analysis. This ability is particularly advantageous when clustering large databases where obtaining even a part of the data can take significant time.

User Interface

FIGS. 9–13 illustrate user interface screens that are depicted on a monitor 47 as data is clustered. Turning to FIG. 9, this screen 300 illustrates a clustering process as that clustering takes place. A progress bar 302 indicates what portion of the entire database has been clustered and a text box 304 above the progress bar 302 indicates how many records have been evaluated. In a center portion of the screen 300 two graphs 310, 312 illustrate clustering parameters as a function of iteration number and cluster ID respectively. The first graph 310 illustrates progress of the clustering in terms of iteration number which is displayed in the text box 314. The iteration number refers to the number of data gathering steps that have occurred since clustering was begun. In the FIG. 9 depiction an energy value for the clustering is calculated as defined in Appendix D method 2. As the clustering continues the energy decreases until a stopping criteria has been satisfied. In the graph 310 of FIG. 9 sixteen iterations are depicted.

The second graph 312 at the bottom of the screen is a graph of clustering parameters as a function of cluster number. In the depiction shown there are ten clusters (shown in the text box 316) and the minimum covariance for each of these ten clusters is shown. Covariance is defined from the model data (FIG. 6D) for a given cluster and a given dimension by the relation:

$$\mathrm{SumSq}/M - \mathrm{Sum} * \mathrm{Sum}/M^2$$

A plot of minimum covariance is therefore a plot of the dimension (1 ... n) for a given cluster model having the least or minimum covariance. A drop down list box 320 allows the user to select other indications of covariance. By selecting a maximum for this parameter, a depiction of the dimension of the model having the maximum covariance (FIG. 10) for each of the ten clusters is shown in the bar graph 312. An average covariance bar graph (FIG. 12) indicates the average of the covariance for each cluster over all cluster dimensions. A different user selection via the drop down list box 320 (FIG. 13) shows the weight M for the ten clusters. In a similar manner, a dropdown list box 322 allows different cluster parameters such as model difference (Appendix D, method 1) to be plotted on the graph 310.

A row 326 of command buttons at the bottom of the screen allow a user to control a clustering process. A parameter screen button 330 allows the user to view a variety of clustering parameters on a screen (not shown). By accessing this screen the user can determine for example a maximum number of records or tuples that can be brought into memory to the data set RS in a given iteration. As an example, the user could indicate that this maximum value is 10,000 records.

As outlined above, as the clustering process is performed data is summarized in DS, CS, and stored in RS. If a number of 10,000 records is chosen as the maximum, the system limits the number of new data that can be read based upon the number of subclusters in the data set CS. Designate the number as ROWSMAX, then the amount of data records that can be currently stored in RS (Rscurrent) is ROWSMAX−2*c where c is the number of subclusters in CS. A progress bar 332 indicates a proportion of data buffers that are currently being used to store RS and CS datasets. This is also depicted as a percentage in a text box 334.

Current data regarding subclustering into the dataset CS is depicted in a panel 340 of the screen. Text boxes 342, 344, 346, 348 in this panel indicate a number of subclusters c, and average, minimum and maximum variances for the subclusters using the above definition of variance. A last text box 350 indicates the average size of the subclusters in terms of data points or tuples in the subclusters.

Additional command buttons allow the user to interact with the clustering as it occurs. A stop button 360 stops the clustering and stores the results to disk. A continue button 362 allows the process to be suspended and resumed by activating a resume button 364. A generate batch button 366 allows the user to generate a clustering batch file which can be executed as a separate process. Finally a close button 368 closes this window without stopping the clustering.

Multiple Model Embodiment

Figure 8:
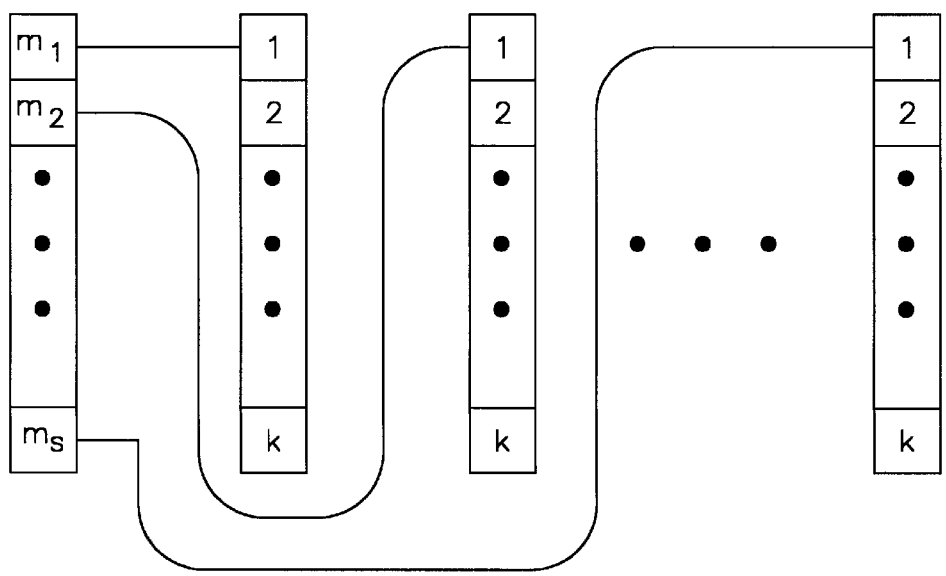
FIG. 8 is a data structure for use in determining multiple data models through practice of the exemplary embodiment of the present invention.

In accordance with an alternate embodiment of the present invention, the process of FIG. 4 is supplemented with a model optimizer. In accordance with this embodiment, a multiple number of different clustering models S are simultaneously generated by the computer 20. Turning to FIG. 8 one sees the data structure of this implementation. There is an array S pointers $m_1 \ldots m_s$ where each pointer points to a different model data structure. The model data structure is depicted in FIG. 6D. In this embodiment the structure CS and RS are shared by the multiple models.

Each of the models $m_s$ is initialized with a different set of centroid vectors (value of 'sum', M=1) for the K different clusters of the model. When data is gathered at the step 110, that data is used to update each of the S models. An extended K-means procedure for the multiple model process takes into account the multiple model aspects of the structures DS and CS is perfrormed on each of the S models. On a first iteration through the FIG. 4 process there is no DS or CS dataset for any of the models so that all data is in the RS dataset. A given data point $r_s$ in the data set RS is compressed into the dataset $DS_j$ for only one of the S models even though it may be close enough to a centroid to compress into a DS dataset for multiple models. The data point $r_s$ is assigned to the set DS of the model whose centroid is closest to the point $r_s$.

DS structures for all the S models are determined by compressing data points into the appropriate DS data structure. The CS data structures for each of the models are then determined from the points remaining in RS. When performing the extended K-means procedure 120, however, the CS sufficient statistics must be augmented with the sufficient statistics contained in the DS data structures of the other models. When performing the extended K-means procedure to update a given model $m_j$, the subclusters in CS must be augmented with the DS structures from the other models. Specifically, when updating model $m_j$, the extended K-means procedure considers the augmented set $CS_j$=CS U (union) $DS_1$ U $DS_2$ . . . $DS_{j-1}$ U $DS_{j+1}$ U . . . $DS_s$ when performing the loop 230 of FIG. 7. If a data point is compressed into DS, it enters the DS set of only one model at the step 240, hence there is no double counting of data.

The multiple model analysis can be performed until one of the models satisfies the stopping criteria at the step 140. An alternate system would continue to compute all the models until each model reaches a stopping criteria. Additionally, the scalable K-means process could be performed until a certain percentage of the models have reached a stopping criteria. The multiple model implementation shares data structures between models and performs calculations on certain data unique to a given model. This analysis is susceptible to parallel processing on a computer 20 having multiple processing units 21.

Computer System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

The following APPENDICES describe components of the scalable K-means analysis

---

Appendix A - Worst Case Analysis

Assume that the following functions are available:
1. [tValue]= ComputeT( alpha, DegreesFreedom): computes the t-statistics for the given value of alpha (1-ConfidenceLevel, in our case) and DegreesFreedom (# of points in a cluster −1 in our case).
2. DSCopy( DSNew, DSOrig): copies DSOrig into DSNew, DSNew is altered, DSOrig remains the same.
3. [WeightVec]= ComputeWeightVec( DataPoint, Model): for K-Means, returns the $\{0, 1\}$ weight vector indicating the cluster to which DataPoint is assigned.
4. AddRS( DataPoint, RS): appends singleton DataPoint to the end of RS, RS is increased by 1 point.

The following functions determine the new sets DS and RS from the old sets, the current Model, and given ConfidenceLevel which is a number between 0 and 1.
[DSNew, RSNew] = WorstCaseAnalysis( DS, RS, Model, Confidence Level)
{
    RSNew = empty;
    k = Length( Model);
    r = Length(RS);
    // first determine values for LOWER and UPPER
    alpha = 1-ConfidenceLevel;
    for l = 1, . . ., k
    {
        Mean = Model(1).GetMean( );
        CVDiag = Model(1).GetCVDiag( );
        TValue = ComputeT( (alpha/n), Model(1).GetNum( )-1 ); // correct t-value
        For j = 1, . . ., n
        {
            LOWER(1).LowVec(j) = Mean(j) − (TValue)*
                sqrt( CVDiag(j)/(Model1(1).GetNum( )));
            UPPER(1).UpVec(j) = Mean(j) + (TValue)*
                Sqrt( CVDiag(j)/(Model(1).GetNum)));
        }
    }
    // Copy DS into DSNew
    DSCopy( DSNew, DS);
    // for each singleton element in r, perform the worst-case "jiggle" and determine
    // if the cluster assignment for this data point changes, if so keep in RS, if not, put
    // inDSNew
    for j = 1, . . ., r
    {
        DataPoint = RS(j).RSVec;
        // Determine the cluster to which this data point is assigned
        [TrueWeightVec] = ComputeWeightVec( DataPoint, Model);
        // Zero out the perturbed model
        Zero( PerturbModel);
        // determine the perturbed model for this data point

```
            for l = 1, . . . , k
            {
            Mean = Model(1).GetMean( );
            If ( TrueWeighVec(1) == 1.0) // DataPoint is assigned to cluster 1
            {
                    // the pertubed model center is as far away from Datapoint
                    // as possible
                    for h = 1, . . ., n
                    {
                        if ( Datapoint(h) >= Mean(h))
                        {
                            PerturbModel(1).Center(h) =
                                LOWER(1).LowVec(h);
                        }
                        else
                        {
                            PerturbModel(1).Center(h) =
                                UPPER(1).UpVec(h);
                        }
                    }
            }
            else
            {
                    // the data point is not assigned to model 1, move the
                    // perturbed
                    // center as close to data point as possible
                    for h = 1, . . . , n
                    {
                        case ( DataPoint(h) >= UPPER(1).UpVec(h))
                        {
                            PerturbModel(1).Center(h) =
                                UPPER(1).UpVec(h);
                        }
                        case (Datapoint(h) <= LOWER(1).LowVec(h))
                        {
                            PerturbModel(1).Center(h) =
                                LOWER(1).LowVec(h);
                        }
                        otherwise
                        {
                            PertubModel(1).Center(h) = Datapoint(h);
                        }
                    }
            }
        }
        // at this point the perturbed model has been determined for the given data
        // point
        // determine the assignement of this point under the perturbed model
        [PerturbWeightVec] = ComputeWeightVec( Datapoint, PerturbModel);
        // determine if the assignments are the same. If so, update the correct
        // DSNew
        // component. If not, put the point in RSNew
        for l = 1, . . ., k
        {
            if ( TrueWeightVec(1) == 1.0) and (PerturbWeightVec(1) == 1.0)
            {
                DSNew(1).Sum += DataPoint;
                DSNew(1).Num ++;
            }
            if ((TrueWeightVec(1) == 1.0) and (PerturbWeightVec(1) == 0.0))
                or ((TrueWeightVec(1) == 0.0) and
                (PerturbeWeightVec == 1.0))
            {
                AddRS( Datapoint, RSNew);
            }
        }
    }
    return DSNew, RSNew;
}
```

Appendix B-Mahalanobis Threshold Analysis

Assume that the following functions are available:
1. [WeightVec] = ComputeWeightVec( DataPoint, Model): in the k-Mean case, returns the {0, 1} weight vector indicating the cluster to which Datapoint is assigned
2. AddRS( Datapoint, RS): appends singleton Datapoint to the end of RS, RS is increased by 1 point.
3. RSDistSort( RSDist): sorts the list RSDistSort from smallest to greatest by the values in MahalDist.
4. [Dist] = DistanceMahalanobis( DataPoint, Center, CVDiagonal): computes the Mahalanobis distance from Datapoint to Center with the given covariance diagonal -continued

```
        CVDiagonal.
    5. [integer] = Floor(float): returns the integer obtained by rounding the float down to the
        nearest integer.
    6. DSCopy(DSNew, DSOrig): copies DSOrig into DSNew, DSNew is altered, DSOrig
        remains the same.
The method:
[DSNew, RSNew] = Threshold( DS, RS, Model, Percentage)
{
    // Percentage is the percentage of points to compress with this function
    DSCopy( DSNew, DS);
    RSNew = empty;
    Initialize(RSDist); // initialize the RSDist structure
    k = Length( Model);
    r = Length( RS);
    // Fill the fields of the RSDist structure
    For j = 1, . . ., r
    {
        // DataPoint = RS(j).RSVec;
        [WeightVec] = ComputeWeightVec( DataPoint, Model);
        for l = 1, . . ., k
        {
            if ( WeightVec(l) == 1.0)
            {
                // DataPoint is assigned to cluster l
                RSDist(j).RSIndex = j;
                RSDist(j).ClustAssign = l;
                RSDist(j).MahalDist = DistanceMahalanobis( DataPoint,
                    Model(l).GetMean( ), Model(l).GetCVDiag( ));
            }
        }
    }
    RSDistSort( RSDist ); // do the sorting
    // determine the number of points to compress
    CompressNum = Floor( r*Percentage);
    For j = 1, . . ., r
    {
        DataPoint = RS(RSDist(j).RSIndex).RSVec;
        if (j <= CompressNum)
        {
            DSNew( RSDis(j).ClustAssign ).Sum += DataPoint;
            DSNew(RSDist(j).ClustAssign)SumSq
            += DataPoint*DataPoint;
            DSNew( RSDist(j).ClustAssign ).Num ++;
        }
        else
        {
            AddRS( DataPoint, RSNew);
        }
    }
    return DSNew, RSNew;
}
```

Appendix C SubCluster data set CS

We assume that the following functions are availale:
1. [Model] = VanillaKMean( Model, Data, StopTol): takes initial values for Model and updates the model with the Data until the model ceases to changes, within StopTol. The updated model is returned in Model.
2. [CSMerged] = MergeCS( CSElem1, CSElem2): take the sufficient statistics for 2 sub-clusters, CS1 and CS2, and computes the sufficient statistics for the sub-cluster formed by merging CS1 and CS2.
3. AddRS( DataPoint, RS): appends singleton DataPoint to the end of RS, RS is increased by 1 point.
4. [SubModel] = RandomSample( RSNew, kPrime): randomly chooses kPrime elements from RSNew and uses these as the initial points for the vanilla k-mean algorithm. The elements are stored in SubModel.
5. [WeightVec] = ComputeWeightVec( DataPoint, Model): computes the {0, 1} weight vector with k elements. DataPoint is assigned to cluster j if the j-th element of the WeightVec is 1, the other elements are 0.
6. Append( integer, integerList): appends the integer to the end of integerList.
7. RemoveCSCandidates( IndexList, CS): removes the elements specified in IndexList from CS and returns the altered, smaller list in CS.
8. [BigCSList] = AppendCS( CSList1, CSList2): creates the BigCSList by appending CSList2 to the end of CSList1.
9. [SubcPartner, SubcPartnerInd]= FindMergePartner( Index, CS): finds the element (subcluster) in CS that has center nearest to CS(Index) (a different subcluster) and returns this element in SubcPartner and its index.
10. AppendCSEnd( CS, CSElement): appends CSElement to the end of the CS list
11. [CSIndex]= FindCSMatch(DataPoint, CS): finds the cluster in CS to which DataPoint is closest and, if DataPoint was merged into that cluster, the "density" criteria would still be satisfied. If no such cluster exists, then this routine returns NULL.
12. [CSMergedElem] = MergeCS(DataPoint,CSElem): merges a singleton data point into a CS cluster and returns the merged Cluster.

The subclustering method:
[CSNew, RSNewer] = CSUpdate( CS, RSNew, StdTol, PointsPerSubClust, MinPoints, StopTol)
{
    // STDTol is a scalar which defines the "dense" criteria discussed above
    // a subcluster is deemed "dense" if the square root of the maximum element of
    // its covariance matrix is less than StdTol
    // PointPerSubClust is an integer which used to determine the number of
    // secondary
    // subclusters to search for in RSNew. The number of sub-cluster to search for is
    // (# of points in RSNew)/(PointsPerSubClust)
    // Minpoints is an integer specialing the minimum number of points allowed in a
    // subcluster. If a sub-cluster does not have have this number of points, the points
    // remain as singletons are are placed in RSNewer.
    // StopTol is a tolerance for the vanilla k-mean algorithm
    // prefiltering
    // filter as many points from rs into cs as possible now
    r = length(RSNew);
    for i = 1, . . ., r
    {
        DataPoint = RSNew(i).RSVec;
        [WeightVec]= computeWeightVec(DataPoint, CS);
        for j = 1, . . ., CS.NumElems
        {
            if (WeightVec(j) == 1.0) {
                if (OkToMerge(DataPoint,CS(j))){
                    CS(j) = Merge(DataPoint, CS(j));
                    RSNew.Remove(i);
                }
            }
        }
    }
    CSCopy( CSNew, CS); // copy CS into CSNew
    RSNewer = empty;
    // determine the number of singleton data elements
    r = length( RSNew);
    // kPrime = the number of "dense" regions in RSNew to search for
    kPrime = floor( r/ PointsPerSubClust);
    // choose the starting point for the vanilla k-Mean algorithm as kPrime random
    // elements
    // ofRSNew
    [SubModel]= RandomSample( RSNew, kPrime);
    // cluster these points and return the sub-clusters in CSCandidates
    [CSCandidates] = VanillaKMean( SubModel, RSNew, StopTol);
    // Filter out the candidates that have fewer than MinPoints and put the points
    // generating
    // these candidates into RSNewer
    CSCandidateRemoveList = empty;
    for 1 = 1, . . ., kPrime
    {
        if(CSCandidates(1).Num < MinPoints)
        {
            // add the points in RSNew nearest to this sub-cluster center to
            RSNewer
            for j = 1, . . ., r
            {
                DataPoint = RSNew(j).RSVec;
                [WeightVec] = ComputeWeightVec( DataPoint,
                CSCandidates);
                if ( WeightVec(1) == 1.0)
                {
                    // this data point is in this sub-cluster
                    AddRS( RSNewer, DataPoint);
                    Append(1, CSCandidateRemoveList);
                }
            }
        }
    }
    // remove those candidates not having enough points in them
    RemoveCS( CSCandidateRemoveList, CsCandidates);
    kDoublePrime = length( CSCandidates);
    CSCandidateRemoveList = empty;
    // filter out the candidates that do not satisfy the "dense" criteria
    for 1, . . ., kDoublePrime
    {
        CVDiag = CSCandidates(1).GetCVDiag( );
        // note that in the next line, sqrt is applied to all of the n elements of

```
        // CVDiag and
        // then the max is over this list of n elements
        If (max(sqrt(CVDiag)) > StdTol)
        {
            // this sub-cluster's max standard deviation is too large
            Append(1, CSCandidateRemoveList);
        }
    }
    remove those candidates satisfying this "dense" criteria
    RemoveCS( CSCandidateRemoveList, CSCandidates);
    [CSNew] = AppendCS(CS, CSCandidates);
    // now consider merging the elements ofCSNew
    done = false;
    CSIndex = 1; // start with the first element ofCSNew
    while (not done)
    {
        // find the partner for CSIndex element of CSNew
        [CsMergePartner, CSMergePartnerIndex] =
FindMergePartner(CSIndex,CSNew);
        // merge the two
        [CandMerge] = MergeCS( CSMergePartner, CSNew( CSIndex));
        see if the merged sub-cluster still satisfies "density" criterion
        if( max( sqrt( CandMerge.GetCvDiag( ))) < StdTol)
        {
            // the merged cluster is "dense" enough
            // remove CSNew(CSIndex) and CSMergePartner from list
            CSNewRemoveList = [CSIndex, CSMergePartnerIndex];
            RemoveCS(CSNewRemoveList, CSNew);
            // append the merged cluster to the end of CSNew
            AppendCSEnd(CSNew, CandMerge);
            // notice by doing the remove, the next sub-cluster to use
            // consider merging is CSNew( CSIndex) so there is no need to
            // increment CSIndex
        }
        else
        {
            // the merged cluster is not "dense" enough
            // do nothing and increment CSIndex
            CSIndex++;
        }
        // See if we've considered mergin all the sub-clusters
        if(CSIndex > length( CSNew))
        {
            done = true;
        }
    }
    return CSNew, RSNewer;
}
```

Appendix D stopping criteria.

Method 1:
```
[Stop] StoppingCrit1( OldModel, NewModel, PrevModelDiff, StopTol)
{
    // OldModel holds the model parameters (means, etc.) over calculated over the
    // last iteration
    // NewModel holds the model parameters over calculated over the current
    // iteration
    // PrevModeDiff is a vector of model deltas over the last (current-1), . . ., (current
    // z)
    // iterations
    // StopTol is a scalar stopping tolerance
    k = length( OldModel);
    // determine the model difference between OldModel and NewModel
    NewDiff = 0.0;
    for 1 = 1,. . ., k
    {
        OldMean = OldModel(1).GetMean( );
        NewMean = NewModel(1).GetMean( );
        NewDiff+= Distance2Norm( OldMean , NewMean);
    }
    NewDiff = (NewDiff/k);
    If ( max([PrevModelDiff, NewDiff]) < StopTol)
    {
        Stop = true;
    }
    else
    {
        Stop = false;
    }
    return Stop;
```

```
}
Method2:
Stopping criteria 2 requires the following function which computes the "Energy" of a
given Model given the sets DS, CS and RS:
[Energy] = EnergyFunctionKMean( Model, DS, CS, RS)
{
    k = length( Model);
    c = length( CS);
    r = length( RS);
    Energy = 0.0;
    // compute energy over the set RS
    for j = 1, . . ., r
    {
        DataPoint = RS(j).RSVec;
        [WeightVec] = ComputeWeightVec( DataPoint, Model);
        for 1 = 1, . . ., k
        {
            if (WeightVec(1) == 1.0)
            {
                Energy +=
                Distance2Norm(DataPoint, Model(1). GetMean( ));
            }
        }
    }
    // compute energy over the set CS
    CSPoints = 0; // count the number of data points summarized by CS
    For j = 1, . . ., c
    {
        CSCenter = CS(j).GetMean( );
        CSPoints += CS(j).GetNum;
        [WeightVec] = ComputeWeightVec( CSCenter, Model);
        for 1 = 1, . . ., k
        {
            if (WeightVec(1) = 1.0)
            {
                Energy += CS(j).GetNum( )*
                    Distance2Norm(CSCenter, Model(1).GetMean( ));
            }
        }
    }
    // compute the energy over DS
    DSPoints = 0; // count the number of points summarized by DS
    For l = 1, . . ., k
    {
        DSCenter = DS(1).GetMean( );
        DSPoints += DS(1).GetNum( );
        Energy += DS(1).GetNum*Distance2Norm(DSCenter,
            Model(1).GetMean( ));
    }
    Energy = (1/(r+CSNum+DSNum))*Energy;
    Return Energy;
}
The method:
[Stop] = StoppingCrit2( OldModel, NewModel, DSOld, DSNew, CSOld, CSNew,
RSOld, RSNew, PrevEnergyDiff, StopTol)
{
    // OldModel holds the model parameters (means, etc,) calculated over the
    // last iteration
    // NewModel holds the model parameters over calculated over the current
    // iteration
    // PrevEnergyDiff is a vector of energy deltas over the last (current-
    1), . . ., (current-z)
    // iterations
    // StopTol is a scalar stopping tolerance
    // determine the difference in energy between the new and old models
    NewEnergy = EnergyFunctionKMean( NewModel, DSNew, CSNew, RSNew);
    OldEnergy = EnergyFunctionKMean( OldModel, DSOld, CSOld, RSOld);
    NewDiff= abs(NewEnergy-OldEnergy);
    If ( max( [PrevModelDiff, NewDiff]) < StopTol)
    {
        Stop = true;
    }
    else
    {
        Stop = false;
    }
    return Stop;
}
```

We claim:

1. In a computer data processing system, a method for clustering data in a database comprising the steps of:

a) choosing a cluster number K for use in categorizing the data in the database into K different clusters;

b) accessing data records from a database and bringing a data portion into a rapid access memory;

c) assigning data records from the data portion to one of the K different clusters and determining a mean of the data records assigned to a given cluster;

d) summarizing at least some of the data assigned to the clusters, storing a summarization of the data within the rapid access memory;

e) accessing an additional portion of the data records in the database and bringing said additional portion into the rapid access memory;

f) again assigning data from the database to a cluster and determining an updated mean from the summarized data and the additional portion of data records; and g) evaluating a criteria to determine if further data should be accessed from the database to continue clustering of data from the database.

2. The method of claim 1 wherein an extended K-means evaluation of the data records and the summarization of data is used to calculate a clustering model that includes a mean for each of the K different clusters in one or less scans of a database and wherein said model is then used as a starting point for further clustering of the database by an alternate clustering process.

3. The method of claim 1 wherein the step of summarizing data includes the substep of identifying data that can be summarized as contributions to a specified one of the K clusters.

4. The method of claim 1 wherein the data records of the database are vectors and the step of summarizing data includes the substep of identifying a discard set of data records that can be summarized as contributions to a specified one of the K clusters and a further step of clustering of some of the data records to produce subclusters of data records for which sufficient statistics are stored.

5. The method of claim 4 wherein the step of again calculating the means of the clusters is performed by adding the sufficient statistics for a subcluster to a closest one of said K clusters.

6. The method of claim 5 wherein the sufficient statistics is derived from compression of data from individual data records falling within a confidence interval in a region of a mean of a cluster of said set of K clusters.

7. The method of claim 5 wherein the sufficient statistics is derived by compressing data from individual data records that are within a specified distance of a mean of one of the K data clusters.

8. The method of claim 5 wherein the sufficient statistics is derived by compressing data from individual data records falling below a threshold of data records within a specified range of a mean of one of the K data clusters.

9. The method of claim 4 wherein the sufficient statistics is derived from either a compression of data records into a single data structure or the creation of multiple data subclusters from additional K-means processing of data records.

10. The method of claim 1 wherein the step of summarizing the data includes the substep of classifying the data into at least two groups and wherein data in a first group is compressed and data in a second group is maintained as data records of the database.

11. The method of claim 10 wherein the first group of data comprises two subgroups of data are summarized by compressing and wherein the data in one of the subgroups is classified into a group of subclusters that form a dense enough clustering of data from the database.

12. The method of claim 11 wherein a model of the clustering is updated each time a portion of the data is accessed from the database and wherein at least some of the data records that are read into the rapid access memory are combined with sufficient statistics of the subclusters before using other data records read from the database to form new subclusters.

13. The method of claim 11 additionally comprising the step of combining subclusters of data so long as the combination of subclusters produces a resultant subcluster that meets a denseness criteria.

14. The method of claim 1 wherein the step of characterizing clustering of data within the database comprises the steps of a) choosing an initial centroid for each of the K data clusters; b) assigning data records to a cluster based on nearness to a cluster centroid; and c) updating the centroids for clusters based on the data from the database.

15. The method of claim 1 wherein the specified criteria stops further characterization based on a comparison of different database models derived from data obtained from the database and the characterization is stopped when a change in said models is less than a specified stopping criteria.

16. The method of claim 1 wherein the specified criteria suspends the characterization of the clustering to allow the characterization to be resumed at a later time.

17. A computer readable medium having stored thereon a data structure, comprising:

a) a first data portion containing a model representation of data stored on a database wherein the model includes K data clusters and wherein the model includes a mean for each cluster and a number of data point assigned to each cluster;

b) a second data portion containing sufficient statistics of a portion of the data in the database; and c) a third data portion containing individual data records obtained from the database for use with the sufficient statistics to determine said model representation contained in the first data portion.

18. The data structure of claim 17 wherein the model representation associated with a data cluster is a vector containing a summation of data records from the database wherein the vector components are attributes of said data records and further wherein the data associated with a data cluster includes the number of data records from the database associated with said cluster.

19. The data structure of claim 18 wherein the model representation associated with a data cluster contains an additional vector containing a summation of a squaring of each attribute of a data records assigned to an associated data cluster.

20. In a computer data mining system, apparatus for evaluating data in a database comprising:

a) one or more data storage devices for storing a database of records on a storage medium;

b) a computer having an interface to the storage devices for reading data from the storage medium and store the data into a rapid access memory for subsequent evaluation; and c) said computer comprising a processing unit for evaluating at least some of the data in the database and for characterizing the data into multiple numbers of data clusters; said processing unit programmed to retrieve a subset of data from the database into the rapid access memory, evaluate the subset of data by assigning data records to one of the multiple number of data clusters, and produce a summarization of at least some of the retrieved data before retrieving additional data from the database.

21. The apparatus of claim 20 wherein the processing unit comprises means for performing an extended K-means analysis on a portion of data retrieved from the database and the summarization of another portion of data retrieved from the database.

22. The apparatus of claim 21 wherein the processing unit further comprises means to subclassify data retrieved from the database into the rapid access memory and wherein some of the data is compressed and by means of further K-means processing to further define the clustering of data within the database.

23. The apparatus of claim 20 wherein the processing unit further comprises means to iteratively bring data from the database and update the characterization of data into clusters until a specified criteria has been reached.

24. The apparatus of claim 20 additional comprising a user interface which updates a user regarding a status of the classification of data and including input means to allow the user to suspend or to stop the process.

25. The apparatus of claim 20 wherein the computer updates multiple clustering models and includes multiple processors for updating said multiple clustering models.

26. In a computer data mining system, a method for use in evaluating data in a database comprising the steps of:
   a) choosing a cluster number K for use in categorizing the data in the database into K different data clusters;
   b) choosing an initial centroid for each of the K data clusters;
   c) sampling a portion of the data in the database from a storage medium to bring said portion of data within a rapid access memory;
   d) assigning individual data records contained within the portion of data to a cluster based on nearness to a cluster centroid and updating the centroids for the clusters based on the data from the database to define a clustering model;
   e) compressing some of the data into data records of sufficient statistics for evaluating a clustering model; and
   f) continuing to sample data from the database, assigning data from the database to a cluster and determining an updated centroid from the data and the sufficient statistics until an evaluating criteria has been satisfied indicating the centroids have been adequately determined from a sampling of a subset of data within the database or until all data within the database has been evaluated.

27. The method of claim 26 wherein a confidence interval is determined for each of the K clusters and wherein data records for each of the K clusters are compressed if perturbing the centroid of all K clusters by an amount equal to the confidence interval does not change the assignment of a record to its associated cluster.

28. In a computer data mining system, a method for evaluating data in a database that is stored on a storage medium comprising the steps of:
   a) initializing multiple storage areas for storing multiple cluster models of the data in the database;
   b) obtaining a portion of the data in the database from a storage medium and assigning data records to the clusters of the multiple cluster models;
   c) using a clustering criteria to characterize a clustering of data from the portion of data obtained from the database for each model;
   d) summarizing at least some of the data contained within the portion of data based upon a compression criteria to produce sufficient statistics for the data satisfying the compression criteria; and
   e) continuing to obtain portions of data from the database and characterizing the clustering of data in the database from newly sampled data and the sufficient statistics for each of the multiple cluster models until a specified criteria has been satisfied.

29. The method of claim 28 wherein a portion of the sufficient statistics is unique for each of the clustering models and wherein a portion of the sufficient statistics is shared between different clustering models.

30. The method of claim 28 wherein the specified criteria is reached when iterative solutions for one of the models does not vary by more that a predetermined amount.

31. The method of claim 28 wherein the specified criteria is reached when iterative solutions for a specified number of the models do not vary by more that a predetermined amount.

32. A computer readable medium for storing program instructions for performing the steps of:
   a) choosing a cluster number K for use in categorizing the data in the database into K different data clusters;
   b) choosing an initial centroid for each of the K data clusters;
   c) sampling a portion of the data in the database from a storage medium to bring said portion of data within a rapid access memory;
   d) assigning individual data records contained within the portion of data to a cluster based on nearness to a cluster centroid and updating the centroids for the clusters based on the data from the database to define a clustering model;
   e) compressing some of the data into data records of sufficient statistics for evaluating a clustering model; and
   f) continuing to sample data from the database, assigning data from the database to a cluster and determining an updated centroid from the data and the sufficient statistics until an evaluating criteria has been satisfied indicating the centroids have been adequately determined from a sampling of a subset of data within the database or until all data within the database has been evaluated.

* * * * *